US012738483B2

(12) United States Patent
Shen et al.

(10) Patent No.: US 12,738,483 B2
(45) Date of Patent: Sep. 15, 2026

(54) POSITIVE ELECTRODE ACTIVE MATERIAL, PREPARATION METHOD THEREOF, POSITIVE ELECTRODE PLATE, SECONDARY BATTERY, AND ELECTRIC APPARATUS

(71) Applicant: CONTEMPORARY AMPEREX TECHNOLOGY CO., LIMITED, Ningde (CN)

(72) Inventors: Chongheng Shen, Ningde (CN); Shuxing Huan, Ningde (CN); Qi Wu, Ningde (CN); Qiang Chen, Ningde (CN); Na Liu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/274,089

(22) Filed: Jul. 18, 2025

(65) Prior Publication Data

US 2025/0349837 A1 Nov. 13, 2025

Related U.S. Application Data

(63) Continuation of application No. PCT/CN2023/095055, filed on May 18, 2023.

(51) Int. Cl.

| | |
|---|---|
| ***H01M 4/131*** | (2010.01) |
| ***H01M 4/36*** | (2006.01) |
| ***H01M 4/525*** | (2010.01) |
| ***H01M 4/62*** | (2006.01) |
| *H01M 4/02* | (2006.01) |

(52) U.S. Cl.

CPC ........... *H01M 4/366* (2013.01); *H01M 4/131* (2013.01); *H01M 4/525* (2013.01); *H01M 4/62* (2013.01); *H01M 2004/021* (2013.01); *H01M 2004/028* (2013.01)

(58) Field of Classification Search

None

See application file for complete search history.

(56) References Cited

U.S. PATENT DOCUMENTS

| | | | | |
|---|---|---|---|---|
| 2020/0112024 | A1* | 4/2020 | Shin | C01G 53/44 |
| 2021/0005874 | A1 | 1/2021 | Park et al. | |
| 2022/0388865 | A1* | 12/2022 | Kim | C01G 53/50 |
| 2023/0077131 | A1* | 3/2023 | Song | H01M 4/624 |
| 2023/0083478 | A1 | 3/2023 | Wu et al. | |

FOREIGN PATENT DOCUMENTS

| | | | |
|---|---|---|---|
| CN | 104409700 | A | 3/2015 |
| CN | 111092197 | A | 5/2020 |
| CN | 114388781 | A | 4/2022 |
| CN | 114614012 | A | 6/2022 |
| CN | 115053367 | A | 9/2022 |

OTHER PUBLICATIONS

The World Intellectual Property Organization (WIPO) International Search Report and Written Opinion for PCT/CN2023/095055 Dec. 25, 2023 11 Pages (including translation).

The European Patent Office (Epo) The Extended European Search Report for U.S. Appl. No. 23/937,051.Feb. 3, 20, 2026 11 Pages.

Van-Chuong HO et al. “Complementary lithium aluminum borate coating of Ni-rich cathode by synergetic boric acid and aluminum hydroxide for lithium-ion batteries.” Materials Today Energy 35 (2023): 101329.

* cited by examiner

*Primary Examiner* — Carlos Barcena

(74) *Attorney, Agent, or Firm* — ANOVA LAW GROUP, PLLC

(57) ABSTRACT

A positive electrode active material, a preparation method thereof, a positive electrode plate, a secondary battery, and an electric apparatus. The positive electrode active material includes: a core and a first coating layer applied on at least a portion of an outer surface of the core, the core includes a lithium-containing nickel-based transition metal oxide, and the first coating layer includes cerium element. In the lithium-containing nickel-based transition metal oxide, a molar proportion of nickel element among all elements excluding lithium element and oxygen element ranges from 50% to 100%.

20 Claims, 3 Drawing Sheets

POSITIVE ELECTRODE ACTIVE MATERIAL, PREPARATION METHOD THEREOF, POSITIVE ELECTRODE PLATE, SECONDARY BATTERY, AND ELECTRIC APPARATUS

CROSS-REFERENCE TO RELATED APPLICATION

This application is a continuation of International Application No. PCT/CN2023/095055, filed on May 18, 2023, the entire content of which is incorporated herein by reference.

TECHNICAL FIELD

This application pertains to the technical field of secondary batteries, and specifically relates to a positive electrode active material, a preparation method thereof, a positive electrode plate, a secondary battery, and an electric apparatus.

BACKGROUND

Secondary batteries, due to outstanding characteristics such as light weight, no pollution, and no memory effect, are widely applied in various consumer electronic products and electric vehicles. Moreover, with the continuous strengthening of people's concepts of green travel and low-carbon living, the market demand for secondary batteries is increasingly growing, and the scope of application is increasingly broadening. The positive electrode material is a key component of secondary ion batteries, participating in the electrochemical reaction of the battery as an electrode material while also serving as a lithium-ion source during battery operation. In related technologies, nickel-containing positive electrode materials are often used to increase the energy density of batteries.

However, secondary batteries using nickel-containing positive electrode materials with high nickel content as the positive electrode active material generally suffer from issues such as low initial Coulombic efficiency and poor high-temperature performance.

SUMMARY

In view of the technical problems existing in the background, this application provides a positive electrode active material, a preparation method thereof, a positive electrode plate, a secondary battery, and an electric apparatus, aiming to improve the initial Coulombic efficiency and high-temperature performance of secondary batteries.

To achieve the above purpose, a first aspect of this application provides a positive electrode active material, including:

- a core, where the core includes a lithium-containing nickel-based transition metal oxide; and in the lithium-containing nickel-based transition metal oxide, a molar proportion of nickel element among all elements excluding lithium element and oxygen element ranges from 50% to 100%; and
- a first coating layer, applied on at least a portion of an outer surface of the core, where the first coating layer includes cerium element.

Compared to existing technologies, this application includes at least the following beneficial effects.

In the positive electrode active material of this application, at least a portion of the outer surface of the core is coated with the first coating layer, and the coating layer includes the cerium element. During the preparation process of the positive electrode active material, the cerium element does not affect an active lithium content on the core surface, and the cerium element can activate a lithiated rock-salt structure on the core surface, making lithium in the lithiated rock-salt structure more active, thereby further improving the initial Coulombic efficiency of the secondary battery. Additionally, when an oxide containing cerium element is used as a precursor containing cerium element, the oxide containing cerium element can react with residual lithium on the core surface to form $LiCeO_2$ with high ionic conductivity, increasing the lithium-ion transmission rate on the core surface, thereby reducing the direct current internal resistance of the secondary battery. In addition, the oxide containing cerium element is likely to form a compact coating layer on the core surface, which can reduce erosion of active sites of the core by electrolyte byproducts, thereby achieving an effect of improving the high-temperature cycling performance and high-temperature storage performance of the secondary battery.

In any embodiment of this application, the first coating layer further includes one or more of cobalt element and fluorine element.

In any embodiment of this application, the first coating layer has at least one of the following characteristics:

(1) a total mass content of the cerium element and the cobalt element relative to a mass of the lithium-containing nickel-based transition metal oxide in the core ranges from 100 ppm to 20000 ppm, optionally from 1000 ppm to 15000 ppm; and optionally, a molar ratio of the cobalt element to the cerium element is (0-0.5):1; and (2) a mass content of the fluorine element relative to the mass of the lithium-containing nickel-based transition metal oxide in the core ranges from 0 ppm to 60000 ppm, optionally from 300 ppm to 60000 ppm, further optionally from 3000 ppm to 45000 ppm.

In any embodiment of this application, a chemical formula of the lithium-containing nickel-based transition metal oxide is $LiNi_xCo_yMn_zM_aM'_bO_2$, where M element includes one or more of Zr, Y, Al, Ti, W, Sr, Ta, Mo, Sb, Nb, Na, K, and Ca, M' element includes one or more of N, F, S, and Cl, $0.6 \le x \le 1$, and $x+y+z+a+b=1$.

In any embodiment of this application, $0.8 \le x \le 1$, $0 \le y \le 0.2$, $0 \le z \le 0.2$, and $0 \le a \le 0.1$.

In any embodiment of this application, the positive electrode active material further includes a second coating layer applied on at least a portion of an outer surface of the first coating layer, where the second coating layer includes one or more of aluminum element and boron element.

In any embodiment of this application, the second coating layer includes the aluminum element and the boron element in a mass ratio of (0.5-2):1.

Optionally, a mass content of the aluminum element relative to the mass of the lithium-containing nickel-based transition metal oxide in the core ranges from 100 ppm to 3500 ppm, further optionally from 500 ppm to 2500 ppm.

Optionally, a mass content of the boron element relative to the mass of the lithium-containing nickel-based transition metal oxide in the core ranges from 100 ppm to 2500 ppm; further optionally from 500 ppm to 2000 ppm.

In any embodiment of this application, a sum of thicknesses of the first coating layer and the second coating layer ranges from 0.01 μm to 1 μm.

In any embodiment of this application, a volume-based average particle size $D_v90$ of the positive electrode active material is denoted as $d_{90}$, a volume-based average particle size $D_v50$ of the positive electrode active material is denoted as $d_{50}$, a volume-based average particle size $D_v10$ of the positive electrode active material is denoted as $d_{10}$, and the volume-based average particle size $D_v90$, the volume-based average particle size $D_v50$, and the volume-based average particle size $D_v10$ of the positive electrode active material satisfy: $(d_{90}-d_{10})/d_{50}\geq 0.5$, optionally $(d_{90}-d_{10})/d_{50}\geq 1.2$.

In any embodiment of this application, a residual lithium content of the positive electrode active material is denoted as Rsd(Li), and the residual lithium content of the positive electrode active material satisfies: 0.15 wt %≤Rsd(Li)≤0.35 wt %, optionally 0.18 wt %≤Rsd(Li)≤0.24 wt %.

In any embodiment of this application, an oxygen defect index of the positive electrode active material is denoted as ODI, and the oxygen defect index of the positive electrode active material satisfies: ODI≥1.75, optionally ODI≥1.8.

A second aspect of this application provides a preparation method of the positive electrode active material of the first aspect of this application, including the following steps:

mixing a lithium salt, a nickel-containing material precursor, and an optional additive, and performing a first sintering treatment to prepare the core; and mixing the core, a precursor containing cerium element, an optional precursor containing cobalt element, and an optional precursor containing fluorine element, and performing a second sintering treatment to prepare the first coating layer on an outer surface of the core;

where an element contained in the optional additive includes one or more of M element and M' element, the M element includes one or more of Zr, Y, Al, Ti, W, Sr, Ta, Mo, Sb, Nb, Na, K, and Ca, and the M' element includes one or more of N, F, S, and Cl.

In any embodiment of this application, a molar amount of lithium element contained in the lithium salt is denoted as m1, a sum of molar amounts of nickel element, cobalt element and manganese element contained in the nickel-containing material precursor and the M element and M' element contained in the optional additive is denoted as m2, and a ratio of m1 to m2 is (0.9-1.1):1.

In any embodiment of this application, the lithium salt includes one or more of lithium hydroxide, lithium carbonate, lithium acetate, lithium nitrate, lithium oxalate, and lithium sulfate.

The optional additive includes one or more of an oxide, hydroxide, acid, fluoride, chloride, sulfate, nitrate, oxalate, acetate, carbonate, lithium salt, ammonium salt, or sodium salt of the M element, and an ammonium salt containing the M' element.

Optionally, the optional additive includes one or more of zirconium oxide, zirconium fluoride, zirconium chloride, yttrium oxide, yttrium sulfate, yttrium nitrate, yttrium oxalate, yttrium acetate, yttrium chloride, aluminum oxide, aluminum fluoride, aluminum chloride, lithium aluminate, titanium oxide, lithium titanate, tungsten oxide, tungstic acid, ammonium tungstate, sodium tungstate, lithium tungstate, strontium oxide, tantalum oxide, niobium oxide, lithium niobate, molybdenum oxide, lithium molybdate, antimony oxide, lithium antimonate, sodium hydroxide, sodium carbonate, sodium chloride, sodium fluoride, sodium oxide, potassium hydroxide, potassium carbonate, potassium chloride, potassium oxide, calcium hydroxide, calcium carbonate, calcium oxide, calcium chloride, calcium fluoride, and ammonium chloride.

The precursor containing cerium element includes one or more of cerium oxide, cerium fluoride, cerium chloride, cerium sulfide, cerium nitrate, and cerium hydroxide.

The optional precursor containing fluorine element includes one or more of cerium fluoride and ammonium fluoride.

The optional precursor containing cobalt element includes one or more of cobalt tetraoxide, cobalt hydroxide, cobaltous oxide, cobalt hydroxyoxide, cobalt acetate, cobalt oxalate, and cobalt carbonate.

In any embodiment of this application, the first sintering treatment includes at least one of the following conditions:

(1) a sintering temperature ranges from 700° C. to 900° C.;

(2) a sintering time ranges from 10 h to 20 h; and (3) a sintering atmosphere is selected from one of air and oxygen;

The second sintering treatment includes at least one of the following conditions:

(1) a sintering temperature ranges from 300° C. to 650° C.;

(2) a sintering time ranges from 3 h to 10 h; and (3) a sintering atmosphere is selected from one of air and oxygen.

In any embodiment of this application, the method further includes the following steps:

after preparing the first coating layer on the surface of the core, mixing the core with a precursor containing aluminum element and a precursor containing boron element, and performing a third sintering treatment to apply the second coating layer on an outer surface of the first coating layer.

In any embodiment of this application, the precursor containing aluminum element includes one or more of aluminum trioxide, aluminum hydroxide, aluminum sulfate, aluminum chloride, and aluminum nitrate.

The precursor containing boron element includes one or more of boron chloride, boron sulfate, boron nitrate, boron nitride, boron oxide, boron fluoride, boron bromide, boron iodide, boric acid, $H_2BO_5PC_5H_6B(OH)_2$, $C_3H_9B_3O_6$, $(C_2H_5O)_3B$, and $(C_3H_7O)_3B$.

In any embodiment of this application, the third sintering treatment includes at least one of the following conditions:

(1) a sintering temperature ranges from 200° C. to 500° C.;

(2) a sintering time ranges from 5 h to 15 h; and (3) a sintering atmosphere is selected from one of air and oxygen.

A third aspect of this application provides a positive electrode plate, including:

a positive electrode current collector; and a positive electrode active material layer, located on at least one side of the positive electrode current collector, where the positive electrode active material layer includes the positive electrode active material of the first aspect of this application or the positive electrode active material prepared using the method of the second aspect of this application.

A fourth aspect of this application provides a secondary battery, including the positive electrode plate of the third aspect of this application.

A fifth aspect of this application provides an electric apparatus, including the secondary battery of the fourth aspect of this application.

BRIEF DESCRIPTION OF DRAWINGS

To more clearly illustrate the technical solutions of this application, a brief introduction to the accompanying drawings used in this application is provided below. Apparently, the accompanying drawings in the following descriptions show merely some embodiments of this application, and persons of ordinary skill in the art may still derive other drawings from the accompanying drawings without creative efforts.

DESCRIPTION OF REFERENCE SIGNS

Figure 1:
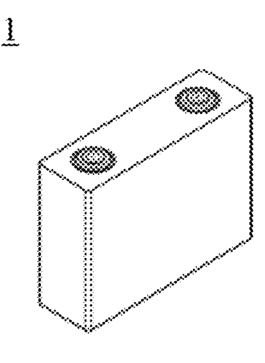
FIG. 1 is a schematic diagram of a secondary battery according to an embodiment of this application.

1. secondary battery; 11. housing; 12. electrode assembly; 13. cover plate; and 2. electric apparatus.

DESCRIPTION OF EMBODIMENTS

The following further elaborates on this application in conjunction with specific embodiments. It should be understood that these specific embodiments are merely intended to illustrate this application but not to limit the scope of this application.

For brevity, only some numerical ranges are specifically disclosed herein. However, any lower limit may be combined with any upper limit to form a range not explicitly stated; and any lower limit may be combined with any other lower limit to form a range not explicitly stated, and similarly any upper limit may be combined with any other upper limit to form a range not explicitly stated. Additionally, each individually disclosed point or single numerical value may itself serve as a lower limit or upper limit to combine with any other point or single numerical value or with any other lower limit or upper limit to form a range not explicitly stated.

The "ranges" disclosed in this application are defined in the form of lower limits and upper limits, and a given range is defined by selecting a lower limit and an upper limit, where the selected lower limit and upper limit define the boundaries of a specific range. Ranges defined in this manner may include or exclude the endpoints and may be arbitrarily combined, meaning any lower limit may be combined with any upper limit to form a range. For example, if ranges of 60-120 and 80-110 are listed for a specific parameter, ranges of 60-110 and 80-120 are also contemplated. Additionally, if minimum range values of 1 and 2 are listed, and if maximum range values of 3, 4, and 5 are listed, the following ranges are all contemplated: 1-3, 1-4, 1-5, 2-3, 2-4, and 2-5. In this application, unless otherwise stated, a numerical range "a-b" represents an abbreviated representation of any combination of real numbers between a and b, where both a and b are real numbers. For example, the numerical range "0-5" means that all real numbers between "0-5" have been fully listed herein, and "0-5" is merely an abbreviated representation of these numerical combinations. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all embodiments and optional embodiments of this application may be combined with each other to form new technical solutions.

Unless otherwise stated, all technical features and optional technical features of this application can be combined with each other to form new technical solutions.

In the description herein, "first aspect", "second aspect", "third aspect", and the like are used merely for descriptive purposes and should not be understood as indicating or implying relative importance or quantity, nor as implicitly indicating the importance or quantity of the technical features indicated. Moreover, "first", "second", "third", and the like are merely used for non-exhaustive enumeration and description purposes and should be understood as not constituting a closed limitation on quantity.

Unless otherwise specified, all steps of this application may be performed sequentially or randomly, in some embodiments sequentially. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Unless otherwise specified, "include" and "contain" mentioned in this application are non-exclusive. For example, "include" and "contain" may indicate that other components not listed may or may not also be included or contained.

In the description herein, it should be noted that, unless otherwise specified. "above" and "below" include the number itself, and "more" in "one or more" means two or more.

In the description of this specification, unless otherwise specified, the term "or (or)" is inclusive. That is, the phrase "A or B" means "A, B, or both A and B". More specifically, any one of the following conditions satisfies the condition "A or B": A is true (or present) and B is false (or not present); A is false (or not present) and B is true (or present); or both A and B are true (or present). In this disclosure, unless otherwise specified, phrases like "at least one of A, B, and C" and "at least one of A, B, or C" both mean only A, only B, only C, or any combination of A, B, and C.

Unless otherwise specified, terms used in this application have the well-known meanings commonly understood by persons skilled in the art. Unless otherwise specified, the numerical values of parameters mentioned in this application may be measured using various measurement methods commonly used in the art (for example, they may be tested according to the methods provided in the embodiments of this application).

Currently, secondary batteries using nickel-containing positive electrode materials with high nickel content as the positive electrode active material suffer from the problem of low initial Coulombic efficiency. Additionally, the initial discharge capacity of secondary batteries is low, and their high-temperature performance is poor. Particularly, a higher nickel content in the nickel-containing positive electrode materials can more significantly increase the energy density of the secondary battery, but the problems of low initial Coulombic efficiency, low initial discharge capacity, and poor high-temperature storage and cycling performance of the secondary battery become more pronounced. Technical personnel of this application have analyzed and found that the main reasons are: the surface of high-nickel positive electrode material particles has a high content of low-activity residual lithium, rock-salt layers, and disordered arrangement of cations, which greatly hinders re-intercalation of lithium ions, resulting in lower initial Coulombic efficiency and initial discharge capacity of the secondary battery. In addition, in a state of significant lithium deintercalation, the surface of the high-nickel positive electrode material particles has highly active lattice oxygen, which easily undergoes side reactions with an electrolyte, thereby leading to poor high-temperature performance of the secondary battery.

A first aspect of this application provides a positive electrode active material, including: a core and a first coating layer applied on at least a portion of an outer surface of the core. The core includes a lithium-containing nickel-based transition metal oxide, and the first coating layer includes cerium element. In the lithium-containing nickel-based transition metal oxide, a molar proportion of nickel element among all elements excluding lithium element and oxygen element ranges from 50% to 100%.

It should be noted that the first coating layer is used merely for descriptive purposes and should not be understood as indicating or implying relative importance or quantity, nor as implicitly indicating the importance or quantity of the technical features indicated. The first coating layer may be applied on a portion of the outer surface of the core or may be applied on the entire outer surface of the core. In some embodiments, the first coating layer is coated on the entire outer surface of the core.

The lithium-containing nickel-based transition metal oxide mentioned above contains both lithium element and nickel element. The lithium-containing nickel-based transition metal oxide may not be doped with other elements or may be doped with other elements. For example, it may be doped with one or more of a metal element and a non-metal element. This may be selected according to actual needs.

In the lithium-containing nickel-based transition metal oxide mentioned above, the molar proportion of nickel element among all elements excluding lithium element and oxygen element ranges from 50% to 100%. For example, the molar proportion may be 55%-100%, 55%-95%, 60%-90%, 65%-85%, 70%-80%, 75%-80%, or the like, with no specific limitation. When the molar proportion of nickel element among all elements excluding lithium element and oxygen element in the lithium-containing nickel-based transition metal oxide falls within the above ranges, using the lithium-containing nickel-based transition metal oxide as the core of the positive electrode active material can increase the gram capacity of the positive electrode active material and increase the energy density of the secondary battery. In an example, the molar proportion of nickel element among all elements excluding lithium element and oxygen element in the lithium-containing nickel-based transition metal oxide may be, but is not limited to, 50%, 55%, 60%, 65%, 70%, 75%, 80%, 85%, 90%, 95%, 100%, or a range defined by any two of these values, with no specific limitation.

It should be noted that the total elements excluding lithium element and oxygen element mentioned above refer to all other elements contained in the lithium-containing nickel-based transition metal oxide other than lithium element and oxygen element.

In an example, the molar proportion of nickel element among all elements excluding lithium element and oxygen element in the lithium-containing nickel-based transition metal oxide mentioned above may be determined with reference to the EPA 6010D-2014 standard, specifically as follows: testing is conducted using ICP-OES (elemental analysis—inductively coupled plasma optical emission spectrometry); a sample to be tested is first dissolved in a strong acid to obtain a liquid; then the liquid is introduced into an ICP light source through atomization; further, gaseous atoms to be tested undergo ionization and excitation in a strong magnetic field, and then return from an excited state to a ground state; energy is released during the above process and recorded as different characteristic spectral lines; and elemental trace analysis is performed based on the characteristic spectral lines to obtain the molar proportion of nickel element among all elements excluding lithium element and oxygen element in the lithium-containing nickel-based transition metal oxide.

Understandably, in the positive electrode active material mentioned above, at least a portion of the outer surface of the core is coated with the first coating layer, and the coating layer includes cerium element. During the preparation process of the positive electrode active material, the cerium element does not affect the active lithium content on the core surface, and the cerium element can activate a lithiated rock-salt structure on the core surface, making lithium in the lithiated rock-salt structure more active, thereby improving the initial Coulombic efficiency of the secondary battery. Additionally, when an oxide containing cerium element is used as a precursor containing cerium element, the oxide containing cerium element can react with residual lithium on the core surface to form $LiCeO_2$ with high ionic conductivity, increasing the lithium-ion transmission rate on the core surface, thereby reducing the direct current internal resistance of the secondary battery. In addition, the oxide containing cerium element is likely to form a compact coating layer on the core surface, which can reduce erosion of active sites of the core by electrolyte byproducts, achieving an effect of improving the high-temperature cycling performance and high-temperature storage performance of the secondary battery.

In some embodiments, the first coating layer further includes one or more of cobalt element and fluorine element. When the first coating layer includes cobalt element, during the preparation process of the positive electrode active material, the cobalt element does not affect the active lithium content on the core surface. Additionally, when an oxide containing cerium element is used as a precursor containing cerium element, the oxide containing cerium element is likely to form a compact coating layer on the core surface, which can reduce erosion of active sites of the core by electrolyte byproducts, achieving an effect of improving the high-temperature cycling performance and high-temperature storage performance of the secondary battery. When the first coating layer includes fluorine element, formation of oxygen defects can be suppressed.

In some embodiments, in the first coating layer, a total mass content of cerium element and cobalt element relative to a mass of the lithium-containing nickel-based transition metal oxide in the core ranges from 100 ppm to 20000 ppm. For example, the total mass content may be 1000 ppm-19000 ppm, 2000 ppm-18000 ppm, 3000 ppm-17000 ppm, 4000 ppm-16000 ppm, 5000 ppm-15000 ppm, 6000 ppm-14000 ppm, 7000 ppm-13000 ppm, 8000 ppm-12000 ppm, 9000 ppm-11000 ppm, or the like, with no specific limitation. When the total mass content of cerium element and cobalt element relative to the mass of the lithium-containing nickel-based transition metal oxide in the core falls within the above ranges, a uniform coating layer can be formed on the core surface, and this can also reduce or even avoid a decrease in gram capacity due to island-like accumulation of elements on the core surface. In an example, the total mass content of cerium element and cobalt element relative to the mass of the lithium-containing nickel-based transition metal oxide in the core may be, but is not limited to, 100 ppm, 500 ppm, 1000 ppm, 2000 ppm, 3000 ppm, 4000 ppm, 5000 ppm, 6000 ppm, 7000 ppm, 8000 ppm, 9000 ppm, 10000 ppm, 11000 ppm, 12000 ppm, 13000 ppm, 14000 ppm, 15000 ppm, 16000 ppm, 17000 ppm, 18000 ppm, 19000 ppm, 20000 ppm, or a range defined by any two of these values. Optionally, the total mass content of cerium element and cobalt element relative to the mass of the lithium-containing nickel-based transition metal oxide in the core ranges from 1000 ppm to 15000 ppm.

In some embodiments, in the first coating layer, a molar ratio of cobalt element to cerium element is (0-0.5):1. For example, the molar ratio may be (0.05-0.5):1. (0.1-0.5):1. (0.15-0.5):1, (0.2-0.5):1. (0.25-0.5):1, (0.3-0.5):1, (0.35-0.5):1. (0.4-0.5):1. (0.45-0.5):1, or the like, with no specific limitation. When the molar ratio of cobalt element to cerium element falls within the above ranges, the secondary battery can have low direct current internal resistance, as well as excellent gram capacity, initial Coulombic efficiency, high-temperature storage performance, and high-temperature cycling performance, and the high-temperature gas production of the secondary battery can be reduced. In an example, the molar ratio of cobalt element to cerium element may be, but is not limited to, 0, 0.05, 0.1, 0.15, 0.2, 0.25, 0.3, 0.35, 0.4, 0.45, 0.5, or a range defined by any two of these values.

In some possible embodiments, in the first coating layer, a mass content of fluorine element relative to a mass of the lithium-containing nickel-based transition metal oxide in the core ranges from 0 ppm to 60000 ppm. For example, the mass content may be, but is not limited to, 0 ppm, 300 ppm, 500 ppm, 1000 ppm, 2000 ppm, 3000 ppm, 4000 ppm, 5000 ppm, 6000 ppm, 7000 ppm, 8000 ppm, 9000 ppm, 10000 ppm, 11000 ppm, 12000 ppm, 13000 ppm, 14000 ppm, 15000 ppm, 16000 ppm, 17000 ppm, 18000 ppm, 19000 ppm, 20000 ppm, 21000 ppm, 22000 ppm, 23000 ppm, 24000 ppm, 25000 ppm, 26000 ppm, 27000 ppm, 28000 ppm, 29000 ppm, 30000 ppm, 41000 ppm, 42000 ppm, 43000 ppm, 44000 ppm, 45000 ppm, 46000 ppm, 47000 ppm, 48000 ppm, 49000 ppm, 50000 ppm, 51000 ppm, 52000 ppm, 53000 ppm, 54000 ppm, 55000 ppm, 56000 ppm, 57000 ppm, 58000 ppm, 59000 ppm, 60000 ppm, or a range defined by any two of these values. When the mass content of fluorine element relative to the mass of the lithium-containing nickel-based transition metal oxide in the core falls within the above ranges, a uniform coating layer can be formed on the core surface, and this can also reduce or even avoid an increase in the valence state of nickel element due to excessive fluorine element while such increase affects the exertion of the gram capacity. Optionally, the mass content of fluorine element relative to the mass of the lithium-containing nickel-based transition metal oxide in the core ranges from 300 ppm to 60000 ppm. Further optionally, the mass content of fluorine element relative to the mass of the lithium-containing nickel-based transition metal oxide in the core ranges from 3000 ppm to 45000 ppm.

In an example, in the first coating layer mentioned above, the total mass content of cerium element and cobalt element relative to the mass of the lithium-containing nickel-based transition metal oxide in the core and the molar ratio of cobalt element to cerium element may be determined with reference to the EPA 6010D-2014 standard, specifically as follows: testing may be conducted using ICP-OES (elemental analysis—inductively coupled plasma optical emission spectrometry); a sample to be tested is first dissolved in a strong acid to obtain a liquid; then the liquid is introduced into an ICP light source through atomization; further, gaseous atoms to be tested undergo ionization and excitation in a strong magnetic field and then return from an excited state to a ground state; energy is released during the above process and recorded as different characteristic spectral lines; elemental trace analysis is performed based on the characteristic spectral lines to determine the form of existence of Co and Ce elements; and the above various items are calculated.

In an example, in the first coating layer mentioned above, the mass content of fluorine element relative to the mass of the lithium-containing nickel-based transition metal oxide in the core may be determined using the following method: qualitative or semi-quantitative analysis is conducted using EDS (energy-dispersive X-ray spectroscopy), to be specific, an electron beam is used to bombard the sample surface in a vacuum chamber to excite the material to emit characteristic X-rays, and qualitative and semi-quantitative analysis is performed for fluorine element based on the wavelength of the characteristic X-rays.

In some embodiments, a chemical formula of the lithium-containing nickel-based transition metal oxide is $LiNi_xCo_yMn_zM_aM'_bO_2$, where M element includes one or more of Zr, Y, Al, Ti, W, Sr, Ta, Mo, Sb, Nb, Na, K, and Ca, M' element includes one or more of N, F, S, and Cl, $0.6 \leq x \leq 1$, and $x+y+z+a+b=1$. Optionally, $0.8 \leq x \leq 1$, $0 \leq y \leq 0.2$, $0 \leq z \leq 0.2$, and $0 \leq a \leq 0.1$.

In an example, specific values of x, y, z, a, and b in the chemical formula $LiNi_xCo_yMn_zM_aM'_bO_2$ of the lithium-containing nickel-based transition metal oxide mentioned above may be determined with reference to the EPA 6010D-2014 standard, specifically as follows: testing may be conducted using ICP-OES (elemental analysis—inductively coupled plasma optical emission spectrometry); a sample to be tested is first dissolved in a strong acid to obtain a liquid; then the liquid is introduced into an ICP light source through atomization; further, gaseous atoms to be tested undergo ionization and excitation in a strong magnetic field; and then return from an excited state to a ground state; energy is released during the above process and recorded as different characteristic spectral lines; and quantitative elemental analysis is performed based on the characteristic spectral lines.

In some embodiments, the positive electrode active material further includes a second coating layer applied on at least a portion of an outer surface of the first coating layer, where the second coating layer includes one or more of aluminum element and boron element. By applying the second coating layer containing aluminum element and boron element, a glass-like substance of $LiAlO_2$ and $Li_3BO_3$ can be formed, which effectively wraps around the grain boundaries of the particles, suppressing the generation of oxygen defects, thereby achieving an effect of inhibiting gas production during high-temperature storage.

It should be noted that the second coating layer is used merely for descriptive purposes and should not be understood as indicating or implying relative importance or quantity, nor as implicitly indicating the importance or quantity of the technical features indicated. The second coating layer may be applied on a portion of the outer surface of the first coating layer or may be applied on the entire outer surface of the first coating layer. In some embodiments, the second coating layer is applied on the entire outer surface of the first coating layer.

The second coating layer may include one of aluminum element and boron element, or may include both aluminum element and boron element. In some embodiments, the second coating layer includes both aluminum element and boron element.

In a possible embodiment, the second coating layer includes aluminum element and boron element in a mass ratio of (0.5-2):1. For example, the mass ratio of aluminum element to boron element in the second coating layer may be (0.6-2):1. (0.6-1.9):1, (0.7-1.8):1, (0.8-1.7):1, (0.9-1.6):1, (1-1.5):1, (1.1-1.4):1, (1.2-1.3):1, or the like, with no specific limitation. When the mass ratio of aluminum element to boron element in the second coating layer falls within the above ranges, the secondary battery can have lower direct current internal resistance, as well as excellent gram capacity, initial Coulombic efficiency, high-temperature storage performance, and high-temperature cycling performance, and the high-temperature gas production of the secondary battery can also be reduced. In an example, the mass ratio of aluminum element to boron element in the second coating layer may be, but is not limited to, 0.5:1, 0.6:1, 0.7:1, 0.8:1, 0.9:1, 1:1, 1.1:1, 1.2:1, 1.3:1, 1.4:1, 1.5:1, 1.6:1, 1.7:1, 1.8:1, 1.9:1, 2:1, or a range defined by any two of these values.

In some embodiments, in the second coating layer, a mass content of aluminum element relative to a mass of the lithium-containing nickel-based transition metal oxide in the core ranges from 100 ppm to 3500 ppm. For example, the mass content may be 100 ppm-3300 ppm, 300 ppm-3000 ppm, 500 ppm-2700 ppm, 800 ppm-2500 ppm, 1000 ppm-2300 ppm, 1300 ppm-2000 ppm, 1500 ppm-1800 ppm, or the like, with no specific limitation. When the mass content of aluminum element relative to the mass of the lithium-containing nickel-based transition metal oxide in the core falls within the above ranges, a uniform second coating layer can be formed on the surface of the first coating layer, and this can also reduce or even avoid a decrease in gram capacity due to island-like accumulation of aluminum element on the surface of the first coating layer. In an example, the mass content of aluminum element relative to the mass of the lithium-containing nickel-based transition metal oxide in the core may be, but is not limited to, 100 ppm, 300 ppm, 500 ppm, 800 ppm, 1000 ppm, 13000 ppm, 1500 ppm, 1800 ppm, 2000 ppm, 2300 ppm, 2500 ppm, 2700 ppm, 3000 ppm, 3300 ppm, 3500 ppm, or a range defined by any two of these values. Optionally, the mass content of aluminum element relative to the mass of the lithium-containing nickel-based transition metal oxide in the core ranges from 500 ppm to 2500 ppm.

In some embodiments, in the second coating layer, a mass content of boron element relative to a mass of the lithium-containing nickel-based transition metal oxide in the core ranges from 100 ppm to 2500 ppm. For example, the mass content may be 100 ppm-2300 ppm, 300 ppm-2000 ppm, 500 ppm-1700 ppm, 800 ppm-1500 ppm, 1000 ppm-1300 ppm, or the like, with no specific limitation. When the mass content of boron element relative to the mass of the lithium-containing nickel-based transition metal oxide in the core falls within the above ranges, a uniform second coating layer can be formed on the surface of the first coating layer, and this can also reduce or even avoid a decrease in gram capacity due to island-like accumulation of boron element on the surface of the first coating layer. In an example, the mass content of boron element relative to the mass of the lithium-containing nickel-based transition metal oxide in the core may be, but is not limited to, 100 ppm, 300 ppm, 500 ppm, 800 ppm, 1000 ppm, 1300 ppm, 1500 ppm, 1700 ppm, 2000 ppm, 2300 ppm, 2500 ppm, or a range defined by any two of these values. Optionally, the mass content of aluminum element relative to the mass of the lithium-containing nickel-based transition metal oxide in the core ranges from 500 ppm to 2000 ppm.

In an example, the mass content of aluminum element relative to the mass of the lithium-containing nickel-based transition metal oxide in the core, the mass content of boron element relative to the mass of the lithium-containing nickel-based transition metal oxide in the core, and the mass ratio of aluminum element to boron element mentioned above may be determined with reference to the EPA 6010D-2014 standard, specifically as follows: testing may be conducted using ICP-OES (elemental analysis—inductively coupled plasma optical emission spectrometry); a sample to be tested is first dissolved in a strong acid to obtain a liquid; then the liquid is introduced into an ICP light source through atomization; further, gaseous atoms to be tested undergo ionization and excitation in a strong magnetic field and then return from an excited state to a ground state; energy is released during the above process and recorded as different characteristic spectral lines; and quantitative elemental analysis is performed based on the characteristic spectral lines.

In some embodiments, a sum of thicknesses of the first coating layer and the second coating layer ranges from 0.01 μm to 1 μm. For example, the sum may be 0.05 μm-1 μm, 0.1 μm-0.9 μm, 0.2 μm-0.8 μm, 0.3 μm-0.7 μm, 0.4 μm-0.6 μm, 0.5 μm-0.6 μm, or the like, with no specific limitation. When the sum of thicknesses of the first coating layer and the second coating layer falls within the above ranges, rapid transport of lithium ions on the core surface layer is facilitated, and an effective protective layer can be formed on the outer surface of the core. In an example, the sum of thicknesses of the first coating layer and the second coating layer may be, but is not limited to, 0.01 μm, 0.05 μm, 0.1 μm, 0.2 μm, 0.3 μm, 0.4 μm, 0.5 μm, 0.6 μm, 0.7 μm, 0.8 μm, 0.9 μm, 1 μm, or a range defined by any two of these values.

In an example, the sum of thicknesses of the first coating layer and the second coating layer mentioned above may be determined using the following method: a sample preparation adhesive and composite positive electrode material powder are uniformly mixed and applied onto a copper foil to obtain a sample, with a weight of the powder being 5 times that of the sample preparation adhesive; and then the sample is dried at 60° C. for 30 miii. The prepared sample is cut into a size of 6 mm×6 mm with scissors and fixed on a sample table; then the sample table is placed in an ion polisher, with the sample edge adjusted to be parallel to a centerline X-axis; and then cutting is performed at a 40-60 μm position of a Y-axis. After cutting, an energy spectrometer (EDS) is used in combination with a scanning electron microscope (SEM); an appropriate particle cross-section is selected from the cut sample; and linear scanning of characteristic element content of the first coating layer and characteristic element content of the second coating layer is performed along a diameter direction of the particle; where a radius of the particle is measured as R; a distance from a position where the element content of the first coating layer begins to increase compared to the core to a center position of the particle is L1; a distance from a position where the element content of the second coating layer begins to increase compared to the core to the center position of the particle is L2; and a total thickness L of the first coating layer and the second coating layer is (R−L1) μm.

In some possible embodiments, a volume-based average particle size $D_v90$ of the positive electrode active material is denoted as $d_{90}$, a volume-based average particle size $D_v50$ of the positive electrode active material is denoted as $d_{50}$, a volume-based average particle size $D_v10$ of the positive electrode active material is denoted as $d_{10}$, and the volume-based average particle size $D_v90$, the volume-based average particle size $D_v50$, and the volume-based average particle size $D_v10$ of the positive electrode active material satisfy: $(d_{90}-d_{10})/d_{50}\geq 0.5$, optionally $(d_{90}-d_{10})/d_{50}\geq 1.2$.

It should be noted that $D_v90$ refers to a particle size corresponding to 90% in a volume distribution, $D_v50$ refers to a particle size corresponding to 50% in a volume distribution, and $D_v10$ refers to a particle size corresponding to 10% in a volume distribution. $(D_v90-D_v10)/D_v50$ represents a volume particle size distribution span of the positive electrode active material, and the volume particle size distribution span of the positive electrode active material is ≥0.5. Optionally, the volume particle size distribution span of the positive electrode active material is ≥1.2. When the volume particle size distribution span of the positive electrode active material is ≥0.5, using the positive electrode active material to prepare a positive electrode plate can achieve a certain effect of filling an electrode plate space, so that a compacted density of the positive electrode plate is ≥3.4 g/cc.

In an example, the volume-based average particle size $D_v90$, the volume-based average particle size $D_v50$, and the volume-based average particle size $D_v10$ of the positive electrode active material mentioned above may be conveniently determined using a laser particle size analyzer with reference to the GB/T 19077-2016/ISO 13320:2009 particle size distribution laser diffraction method, such as the Mastersizer 3000E laser particle size analyzer from Malvern Instruments Ltd., UK.

In some embodiments, a residual lithium content of the positive electrode active material is denoted as Rsd(Li), and the residual lithium content of the positive electrode active material satisfies: 0.15 wt %≤Rsd(Li)≤0.35 wt %. For example, the residual lithium content may be 0.16 wt %≤Rsd(Li)≤0.35 wt %, 0.16 wt %≤Rsd(Li)≤0.34 wt % 0.17 wt %≤Rsd(Li)≤0.33 wt %, 0.18 wt %≤Rsd(Li)≤0.32 wt %, 0.19 wt %≤Rsd(Li)≤0.31 wt %, 0.2 wt %≤Rsd(Li)≤0.3 wt %, 0.21 wt %≤Rsd(Li)≤0.29 wt %, 0.22 wt %≤Rsd(Li)≤0.28 wt %, 0.23 wt %≤Rsd(Li)≤0.27 wt %, 0.24 wt %≤Rsd(Li) ≤0.26 wt %, 0.24 wt %≤Rsd(Li)≤0.25 wt %, or the like, with no specific limitation. When the residual lithium content of the positive electrode active material falls within the above ranges, a qualification rate of processing performance of a positive electrode slurry can be improved, and excessive reduction of active lithium in the positive electrode active material can be prevented. In an example, the residual lithium content Rsd(Li) of the positive electrode active material may be, but is not limited to, 0.15 wt %, 0.16 wt %, 0.17 wt %, 0.18 wt %, 0.19 wt %, 0.2 wt %, 0.21 wt %, 0.22 wt %, 0.23 wt %, 0.24 wt %, 0.25 wt %, 0.26 wt %, 0.27 wt %, 0.28 wt %, 0.29 wt %, 0.3 wt %, 0.31 wt %, 0.32 wt %, 0.33 wt %, 0.34 wt %, 0.35 wt %, or a range defined by any two of these values. Optionally, the residual lithium content of the positive electrode active material satisfies: 0.18 wt %≤Rsd(Li)≤0.24 wt %.

It should be noted that the residual lithium content of the positive electrode active material mentioned above refers to an overall residual lithium content of the positive electrode active material.

In an example, the residual lithium content of the positive electrode active material mentioned above may be determined with reference to the GBIT 9736-2008 general method for determination of acidity and alkalinity of chemical reagents, specifically as follows: 10 g-30 g of sample powder to be tested is weighed, added with 100 mL pure water, stirred for 30 min, and left standing for 10 min; a certain amount of filtrate is taken after suction tiltration; a 0.05 mol/L standard hydrochloric acid solution is selected to expel bubbles in a titration tube; a corresponding sensor and program are selected to start a potentiometric titration test; and the residual lithium content is calculated based on reaction potentials of carbonate and hydroxide ions.

In some embodiments, an oxygen defect index of the positive electrode active material is denoted as ODI, and the oxygen defect index of the positive electrode active material satisfies: ODI≥1.75. When the oxygen defect index of the positive electrode active material falls within the above ranges, the high-temperature cycling performance and high-temperature storage performance of the secondary battery can be improved, and the gas production during storage of the secondary battery can be reduced. Optionally, the oxygen defect index of the positive electrode active material satisfies: ODI≥1.8.

In an example, the oxygen defect index of the positive electrode active material mentioned above may be determined using the following method: a region from 35°-50° in an XRD spectrum of a sample to be tested is scanned slowly (<2°/min), and an image is processed by smoothing and filtering to obtain diffraction peak areas I101 and I012 of (101) and (012) crystal planes; and the oxygen defect index is calculated according to (I101/I012)^0.5.

A second aspect of this application provides a preparation method of the positive electrode active material of the first aspect of this application, including the following steps.

Mix a lithium salt, a nickel-containing material precursor, and an optional additive, and perform a first sintering treatment to prepare the core.

Mix the core, a precursor containing cerium element, an optional precursor containing cobalt element, and an optional precursor containing fluorine element, and perform a second sintering treatment to prepare the first coating layer on an outer surface of the core.

An element contained in the optional additive includes one or more of M element and M' element; the M element includes one or more of Zr, Y, Al, Ti, W, Sr, Ta, Mo, Sb, Nb, Na, K, and Ca; and the M' element includes one or more of N, F, S, and Cl.

It should be noted that the first sintering treatment and the second sintering treatment are used merely for descriptive purposes and should not be understood as indicating or implying relative importance or quantity, nor as implicitly indicating the importance or quantity of the technical features indicated.

It should be noted that the optional additive refers to a material that may be selectively added during preparation of the core; the optional precursor containing cobalt element refers to a material that may be selectively added during preparation of the first coating layer on the outer surface of the core; and the optional precursor containing fluorine element refers to a material that may be selectively added during preparation of the first coating layer on the outer surface of the core.

In some embodiments, a molar amount of lithium element contained in the lithium salt is denoted as m1, a sum of molar amounts of nickel element, cobalt element and manganese element contained in the nickel-containing material precursor and the M element and M' element contained in the optional additive is denoted as m2, and a ratio of m1 to m2 is (0.9-1.1):1. For example, the ratio may be (0.91-1.09):1, (0.92-1.08):1, (0.93-1.07):1, (0.94-1.06):1, (0.95-1.05):1, (0.96-1.04):1. (0.97-1.03):1, (0.98-1.02):1. (0.99-1.01):1, or the like, with no specific limitation. When the ratio of m1 to m2 falls within the above ranges, the gram capacity of the secondary battery can be improved to meet the needs of novel batteries. In an example, the ratio of m1 to m2 may be, but is not limited to, 0.9:1, 0.91:1, 0.92:1, 0.93:1, 0.94:1, 0.95:1, 0.96:1, 0.97:1, 0.98:1, 0.99:1, 1:1, 1.01:1, 1.02:1, 1.03:1, 1.04:1, 1.05:1, 1.06:1, 1.07:1, 1.08:1, 1.09:1, 1.1:1, or a range defined by any two of these values.

In a possible embodiment, the lithium salt includes one or more of lithium hydroxide, lithium carbonate, lithium acetate, lithium nitrate, lithium oxalate, and lithium sulfate.

The precursor containing cerium element includes one or more of cerium oxide, cerium fluoride, cerium chloride, cerium sulfide, cerium nitrate, and cerium hydroxide.

The optional precursor containing fluorine element includes one or more of cerium fluoride and ammonium fluoride.

The optional precursor containing cobalt element includes one or more of cobalt tetraoxide, cobalt hydroxide, cobaltous oxide, cobalt hydroxyoxide, cobalt acetate, cobalt oxalate, and cobalt carbonate.

The optional additive includes one or more of an oxide, hydroxide, acid, fluoride, chloride, sulfate, nitrate, oxalate, acetate, carbonate, lithium salt, ammonium salt, or sodium salt of the M element, and an ammonium salt containing the M' element.

In some embodiments, the optional additive includes one or more of zirconium oxide, zirconium fluoride, zirconium chloride, yttrium oxide, yttrium sulfate, yttrium nitrate, yttrium oxalate, yttrium acetate, yttrium chloride, aluminum oxide, aluminum fluoride, aluminum chloride, lithium aluminate, titanium oxide, lithium titanate, tungsten oxide, tungstic acid, ammonium tungstate, sodium tungstate, lithium tungstate, strontium oxide, tantalum oxide, niobium oxide, lithium niobate, molybdenum oxide, lithium molybdate, antimony oxide, lithium antimonate, sodium hydroxide, sodium carbonate, sodium chloride, sodium fluoride, sodium oxide, potassium hydroxide, potassium carbonate, potassium chloride, potassium oxide, calcium hydroxide, calcium carbonate, calcium oxide, calcium chloride, calcium fluoride, and ammonium chloride.

In some embodiments, a sintering temperature for the first sintering treatment ranges from 700° C. to 900° C. For example, the sintering temperature may be 750° C.-900° C., 750° C.-850° C., 750° C.-800° C., 800° C.-850° C., or the like, with no specific limitation. In an example, the sintering temperature for the first sintering treatment may be, but is not limited to, 700° C., 720° C., 750° C. 780° C. 800° C., 830° C., 850° C., 870° C., 900° C., or a range defined by any two of these values.

In some embodiments, a sintering time for the first sintering treatment ranges from 10 h to 12 h. For example, the sintering time may be 10.5 h-12 h, 11 h-12 h, 11.5 h-12 h, or the like, with no specific limitation. In an example, the sintering time for the first sintering treatment may be, but is not limited to, 10 h, 10.5 h, 11 h, 11.5 h, 12 h, or a range defined by any two of these values.

In some embodiments, a sintering atmosphere for the first sintering treatment is selected from one of air and oxygen.

In some embodiments, a sintering temperature for the second sintering treatment ranges from 300° C. to 650° C. For example, the sintering temperature may be 350° C.-650° C., 400° C.-600° C., 450° C.-550° C., 500° C.-550° C., or the like, with no specific limitation. In an example, the sintering temperature for the second sintering treatment may be, but is not limited to, 300° C., 350° C., 400° C., 450° C., 500° C., 550° C., 600° C., 650° C., or a range defined by any two of these values.

In some embodiments, a sintering time for the second sintering treatment ranges from 3 h to 10 h. For example, the sintering time may be 3 h-9 h, 4 h-8 h, 5 h-7 h, 5 h-6 h, or the like, with no specific limitation. In an example, the sintering time for the second sintering treatment may be, but is not limited to, 3 h, 4 h, 5 h, 6 h, 7 h, 8 h, 9 h, 10 h, or a range defined by any two of these values.

In some embodiments, a sintering atmosphere for the second sintering treatment is selected from one of air and oxygen.

In a possible embodiment, the preparation method of the positive electrode active material further includes the following steps:

after preparing the first coating layer on the surface of the core, mixing the core with a precursor containing aluminum element and a precursor containing boron element, and performing a third sintering treatment to coat the second coating layer on the outer surface of the first coating layer.

It should be noted that the third sintering treatment is used merely for descriptive purposes and should not be understood as indicating or implying relative importance or quantity, nor as implicitly indicating the importance or quantity of the technical features indicated.

In some embodiments, the precursor containing aluminum element includes one or more of aluminum trioxide, aluminum hydroxide, aluminum sulfate, aluminum chloride, and aluminum nitrate.

The precursor containing boron element includes one or more of boron chloride, boron sulfate, boron nitrate, boron nitride, boron oxide, boron fluoride, boron bromide, boron iodide, boric acid, $H_2BO_5PC_5H_6B(OH)_2$, $C_3H_9B_3O_6$, $(C_2H_5O)_3B$, and $(C_3H_7O)_3B$.

In some embodiments, a sintering temperature for the third sintering treatment ranges from 200° C. to 500° C. For example, the sintering temperature may be 250° C.-500° C., 300° C.-450° C., 350° C.-400° C., or the like, with no specific limitation. In an example, the sintering temperature for the third sintering treatment may be, but is not limited to, 200° C., 250° C., 300° C., 350° C., 400° C., 450° C., 500° C., or a range defined by any two of these values.

In some embodiments, a sintering time for the third sintering treatment ranges from 5 h to 15 h. For example, the sintering time may be 6 h-14 h, 7 h-13 h, 8 h-12 h, 9 h-11 h, 10 h-11 h, or the like, with no specific limitation. In an example, the sintering time for the third sintering treatment may be, but is not limited to, 5 h, 6 h, 7 h, 8 h, 9 h, 10 h, 11 h, 12 h, 13 h, 14 h, 15 h, or a range defined by any two of these values.

In some embodiments, a sintering atmosphere for the third sintering treatment is selected from one of air and oxygen.

In an example, the positive electrode active material of the first aspect of this application may be prepared using the following method.

Step S1: Mix a lithium salt, a nickel-containing material precursor, and an additive in a plow mixer, a high-speed mixer, or an inclined mixer; then place the mixed materials in a kiln for a first sintering treatment at a sintering temperature of 700-900° C. for a sintering time of 10-20 h in a sintering atmosphere of air or high-purity oxygen to obtain an intermediate product after the first sintering; and mechanically grind and sieve the intermediate product in a vibrating manner to prepare a core; where a ratio of a sum of molar amounts of nickel element, cobalt element, manganese element contained in the nickel-containing material precursor and M element and M' element contained in the additive to a molar amount of lithium element contained in the lithium salt is 1:(0.9-1.1).

Step S2: Mix the core, a precursor containing cerium element, a precursor containing cobalt element, and a precursor containing fluorine element in a plow mixer, a high-speed mixer, or an inclined mixer in an inert atmosphere or air, and then place the mixture in a kiln for a second sintering treatment at a sintering temperature of 300-650° C. for a sintering time of 3-10 h in a sintering atmosphere of air or high-purity oxygen, to obtain a first coating layer on the surface of the core after sintering.

Step S3: Mechanically grind and sieve the material obtained in Step S2, then mix the material with a precursor containing aluminum element and a precursor containing boron element, and perform a third sintering treatment at a sintering temperature of 200-500° C. for a sintering time of 5-15 h in a sintering atmosphere of air or high-purity oxygen, to obtain a second coating layer on the surface of the first coating layer after sintering, which is the positive electrode active material.

The positive electrode active material prepared by the preparation method of the positive electrode active material of the second aspect of this application has a volume particle size distribution span ≥0.5, a residual lithium content of 0.15 wt %-0.35 wt %, and an oxygen defect index ≥1.75; the outer surface of the core is uniformly coated with the first coating layer formed by cerium element or at least one of cerium element, cobalt element, and fluorine element; the outer surface of the first coating layer is uniformly coated with the second coating layer formed by at least one of aluminum element and boron element; and the positive electrode active material formed through the above coating has high gram capacity and rate performance, as well as excellent high-temperature cycling performance and high-temperature storage performance.

A third aspect of this application provides a positive electrode plate, including a positive electrode current collector and a positive electrode active material layer located on at least one side of the positive electrode current collector, where the positive electrode active material layer includes the positive electrode active material of the first aspect of this application or the positive electrode active material prepared using the method of the second aspect of this application.

In an example, the positive electrode current collector has two opposite surfaces in a thickness direction thereof, and the positive electrode active material layer is disposed on either or both of the two opposite surfaces of the positive electrode current collector.

In some embodiments, the positive electrode active material may further include one or more of lithium iron manganese phosphate, lithium cobalt oxide, lithium manganese oxide, and a compound obtained by adding other transition metal elements or non-transition metal elements to the above lithium-containing compound.

In an example, the lithium cobalt oxide may include, but is not limited to, $LiCoO_2$; and the lithium manganese oxide may include, but is not limited to, one or more of $LiMnO_2$ and $LiMn_2O_4$.

In some embodiments, the positive electrode active material may further include other positive electrode active materials known in the art for batteries. In an example, the positive electrode active material may further include at least one of the following materials: lithium-containing phosphates with an olivine structure. However, this application is not limited to these materials, and other conventional materials that can be used as positive electrode active materials for batteries may also be used. One of these positive electrode active materials may be used alone, or two or more of them may be used in combination. Examples of lithium-containing phosphates with an olivine structure may include, but are not limited to, at least one of lithium iron phosphate (such as $LiFePO_4$ (also abbreviated as LFP)), a composite material of lithium iron phosphate and carbon, lithium manganese phosphate (such as $LiMnPO_4$), a composite material of lithium manganese phosphate and carbon, and a composite material of lithium iron manganese phosphate and carbon. A weight percentage of the positive electrode active material in the positive electrode active material layer ranges from 80-100 wt %, based on a total weight of the positive electrode active material layer.

In some embodiments, the positive electrode current collector may be a metal foil or a composite current collector. For example, aluminum foil may be used as the metal foil. The composite current collector may include a polymer material substrate and a metal layer formed on at least one surface of the polymer material substrate. The composite current collector may be formed by forming a metal material on a polymer material substrate. The metal material includes, but is not limited to, aluminum, aluminum alloy, nickel, nickel alloy, titanium, titanium alloy, silver, and silver alloy. The polymer material substrate includes, but is not limited to, one or more of polypropylene (PP), polyethylene terephthalate (PET), polybutylene terephthalate (PBT), polystyrene (PS), and polyethylene (PE).

In some embodiments, the positive electrode active material layer further optionally includes a binder. In an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin. A weight percentage of the binder in the positive electrode active material layer ranges from 0-20 wt %, based on a total weight of the positive electrode active material layer.

In some embodiments, the positive electrode active material layer further optionally includes a conductive agent. In an example, the conductive agent may include at least one of superconducting carbon, acetylene black, carbon black, Ketjen black, carbon dots, carbon nanotubes, graphene, and carbon nanofibers. A weight percentage of the conductive agent in the positive electrode active material layer ranges from 0-20 wt %, based on a total weight of the positive electrode active material layer.

In some embodiments, the positive electrode plate may be prepared as follows: components for preparing the positive electrode plate, such as the positive electrode active material, conductive agent, binder, and any other components, are dispersed in a solvent (such as N-methylpyrrolidone) to form a positive electrode slurry, where a solid content of the positive electrode slurry ranges from 40-80 wt %, and a viscosity at room temperature is adjusted to 5000-25000 mPa·s; the positive electrode slurry is applied on both side surfaces of the positive electrode current collector, and the positive electrode current collector is dried, and then cold-pressed by a cold rolling machine to form the positive electrode plate; a single-side coating areal density of the positive electrode powder ranges from 15-45 mg/cm$^2$; and a compacted density of the positive electrode plate ranges from 2-4.3 g/cm$^3$, optionally from 2.5-4.3 g/cm$^3$. A formula for calculating the compacted density is:

compacted density=coating surface density/(thickness of electrode plate after rolling−thickness of current collector).

Secondary Battery

A fourth aspect of this application provides a secondary battery, including the positive electrode plate of the third aspect of this application.

Thus, the resulting secondary battery has high energy density, high initial Coulombic efficiency, and high initial discharge gram capacity, as well as excellent high-temperature cycling performance and high-temperature storage performance.

The following describes a secondary battery, a battery module, a battery pack, and an electric apparatus of this application with appropriate reference to the accompanying drawings.

An embodiment of this application provides a secondary battery.

Typically, a secondary battery includes a positive electrode plate, a negative electrode plate, an electrolyte, and a separator. In a charge and discharge process of the battery, active ions are intercalated and deintercalated back and forth between the positive electrode plate and the negative electrode plate. The electrolyte conducts ions between the positive electrode plate and the negative electrode plate. The separator is disposed between the positive electrode plate and the negative electrode plate, primarily serving to prevent a short circuit between the positive and negative electrodes while allowing ions to pass through.

Negative Electrode Plate

The negative electrode plate includes a negative electrode current collector and a negative electrode active material layer disposed on at least one surface of the negative electrode current collector, where the negative electrode active material layer includes a negative electrode active material.

For example, the negative electrode current collector includes two opposite surfaces in a thickness direction thereof, and the negative electrode active material layer is disposed on either or both of the two opposite surfaces of the negative electrode current collector.

In some embodiments, the negative electrode active material may be a negative electrode active material known in the art for batteries. In an example, the negative electrode active material may include at least one of the following materials: artificial graphite, natural graphite, soft carbon, hard carbon, silicon-based material, tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, this application is not limited to these materials, and other conventional materials that can be used as negative electrode active materials for batteries may also be used. One of these negative electrode active materials may be used alone, or two or more of them may be used in combination. A weight percentage of the negative electrode active material in the negative electrode film layer ranges from 70-100 wt %, based on a total weight of the negative electrode film layer.

In some embodiments, the negative electrode current collector may be a metal foil or a composite current collector. For example, a copper foil may be used as the metal foil. The composite current collector may include a polymer material substrate and a metal layer formed on at least one surface of the polymer material substrate. The composite current collector may be formed by depositing a metal material on a polymer material substrate. The metal material includes, but is not limited to, copper, copper alloy, nickel, nickel alloy, titanium, titanium alloy, silver, and silver alloy, and the polymer material substrate includes, but is not limited to, a substrate such as polypropylene (PP), polyethylene terephthalate (PET), polybutylene terephthalate (PBT), polystyrene (PS), and polyethylene (PE).

In some embodiments, the negative electrode active material layer further optionally includes a binder. The binder may be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS). A weight percentage of the binder in the negative electrode active material layer ranges from 0-30 wt %, based on a total weight of the negative electrode active material layer.

In some embodiments, the negative electrode active material layer further optionally includes a conductive agent. The conductive agent may be selected from at least one of superconducting carbon, acetylene black, carbon black. Ketjen black, carbon dots, carbon nanotubes, graphene, and carbon nanoliber. A weight percentage of the conductive agent in the negative electrode active material layer ranges from 0-20 wt %, based on a total weight of the negative electrode active material layer.

In some embodiments, the negative electrode active material layer further optionally includes another additive such as a thickener (for example, sodium carboxymethyl cellulose (CMC-Na)). A weight percentage of the another additive in the negative electrode active material layer ranges from 0-15 wt %, based on a total weight of the negative electrode active material layer.

In some embodiments, the negative electrode plate may be prepared as follows: components for preparing the negative electrode plate, such as the negative electrode active material, conductive agent, binder, and any other components, are dispersed in a solvent (such as deionized water) to form a negative electrode slurry, where a solid content of the negative electrode slurry ranges from 30-70 wt %, and a viscosity at room temperature is adjusted to 2000-10000 mPa·s; the obtained negative electrode slurry is applied on both side surfaces of the negative electrode current collector; and the negative electrode current collector is dried, and cold-pressed, for example, by rolling, to obtain a negative electrode plate. A single-side coating areal density of the negative electrode powder ranges from 7-22 mg/cm$^2$, and a compacted density of the negative electrode plate ranges from 1.2-2.0 g/m$^3$.

Electrolyte

The electrolyte serves to conduct ions between the positive electrode plate and the negative electrode plate. The type of the electrolyte is not specifically limited in this application and may be selected based on needs. For example, the electrolyte may be in a liquid state, a gel state, or an all-solid state.

In some embodiments, the electrolyte is an electrolyte solution. The electrolyte solution includes an electrolytic salt and a solvent.

In some embodiments, the electrolytic salt may be selected from one or more of lithium hexafluorophosphate ($LiPF_6$), lithium tetrafluoroborate ($LiBF_4$), lithium perchlorate ($LiClO_4$), lithium hexafluoroarsenate (LiAsFo), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalato)borate (LiBOB), lithium difluorophosphate ($LiPO_2F_2$), lithium difluoro(bisoxalato)

phosphate (LiDFOP), and lithium tetrafluoro(oxalato)phosphate (LiTFOP). A concentration of the electrolytic salt is typically 0.5-5 mol/L.

In some embodiments, the solvent may be selected from one or more of fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and ethyl sulfonylethane (ESE).

In some embodiments, the electrolyte solution further optionally includes an additive. For example, the additive may include a negative electrode film-forming additive or a positive electrode film-forming additive, or may include an additive capable of improving some performance of the battery, for example, an additive for improving overcharge performance of the battery, or an additive for improving high-temperature or low-temperature performance of the battery.

Separator

In some embodiments, the secondary battery further includes a separator. The type of the separator is not particularly limited in this application, and any well-known porous structure separator with good chemical stability and mechanical stability may be selected.

In some embodiments, a material of the separator may be selected from at least one of glass fiber, non-woven fabric, polyethylene, polypropylene, and polyvinylidene fluoride. The separator may be a single-layer film or a multilayer composite film, with no particular limitation. When the separator is a multilayer composite film, the layers may be made of the same or different materials, with no particular limitation.

In some embodiments, a thickness of the separator ranges from 6-40 μm, optionally from 12-20 μm.

In some embodiments, the positive electrode plate, the negative electrode plate, and the separator may be made into an electrode assembly through winding or stacking.

In some embodiments, the secondary battery may include an outer package. The outer package may be used to encapsulate the electrode assembly and the electrolyte.

In some embodiments, the outer package of the secondary battery may be a hard shell, for example, a hard plastic shell, an aluminum shell, or a steel shell. The outer package of the secondary battery may alternatively be a soft package, such as a pouch soft package. A material of the soft package may be plastic, examples of which include polypropylene, polybutylene terephthalate, polybutylene succinate, and the like.

In some embodiments, the secondary battery is a lithium-ion battery.

The secondary battery is not limited to any particular shape in this application, and may be cylindrical, square, or of any other arbitrary shape. For example, FIG. 1 shows a secondary battery 1 of a square structure as an example.

Figure 2:
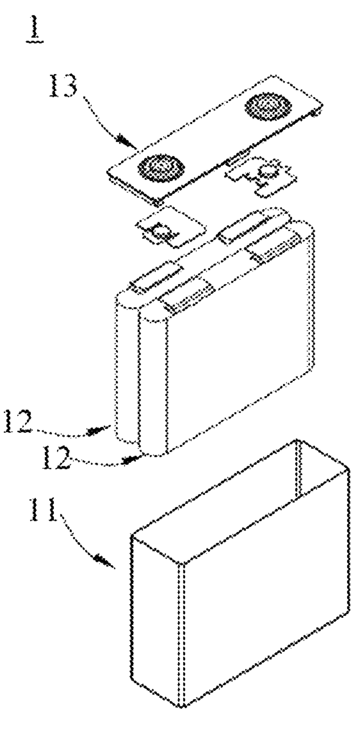
FIG. 2 is an exploded view of the secondary battery according to the embodiment of this application shown in FIG. 1.

In some embodiments, referring to FIG. 2, the outer package may include a housing 11 and a cover plate 13. The housing 11 may include a bottom plate and side plates connected onto the bottom plate, where the bottom plate and the side plates enclose to form an accommodating cavity. The housing 11 has an opening communicating with the accommodating cavity, and the cover plate 13 can cover the opening to seal the accommodating cavity.

The positive electrode plate, the negative electrode plate, and the separator may be wound or stacked to form an electrode assembly 12. The electrode assembly 12 is encapsulated in the accommodating cavity. A positive electrode electrolyte provides infiltration between the positive electrode plate and the separator, and a negative electrode electrolyte provides infiltration between the negative electrode plate and the separator. The secondary battery 1 may include one or more electrode assemblies 12, and this can be adjusted based on needs.

In some embodiments, the secondary battery may be assembled into a battery module, where the battery module may include a plurality of secondary batteries, and a specific number may be adjusted according to an application and capacity of the battery module.

In the battery module, the plurality of secondary batteries may be arranged along a length direction of the battery module. Certainly, the plurality of secondary batteries may alternatively be arranged in any other manner. Further, the plurality of secondary batteries may be fastened using fasteners.

Optionally, the battery module may further include an enclosure with an accommodating space, and the plurality of secondary batteries are accommodated in the accommodating space.

In some embodiments, the battery module may further be assembled into a battery pack, where the number of battery modules contained in the battery pack may be adjusted according to an application and capacity of the battery pack.

The battery pack may include a battery box and a plurality of battery modules arranged in the battery box. The battery box includes an upper box body and a lower box body. The upper box body can cover the lower box body to form an enclosed space for accommodating the battery modules. The plurality of battery modules may be arranged in the battery box in any manner.

Electric Apparatus

This application further provides an electric apparatus. The electric apparatus includes at least one of the secondary battery, the battery module, or the battery pack. The secondary battery, the battery module, or the battery pack may be used as a power source of the apparatus or as an energy storage unit of the apparatus. The apparatus may be, but is not limited to, a mobile device, an electric vehicle, an electric train, a ship, a satellite, and an energy storage system; where the mobile device may include, but is not limited to, at least one of a mobile phone and a laptop; and the electric vehicle may include, but is not limited to, at least one of a battery electric vehicle, a hybrid electric vehicle, a plug-in hybrid electric vehicle, an electric bicycle, an electric scooter, an electric golf cart, and an electric truck.

The secondary battery, battery module, or battery pack may be selected according to the use requirements of the apparatus.

Figure 3:
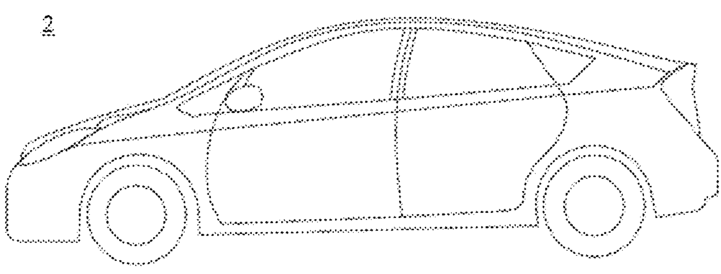
FIG. 3 is a schematic diagram of an electric apparatus using a secondary battery as a power source according to an embodiment of this application.

FIG. 3 shows an electric apparatus 2 as an example. This electric apparatus 2 is a battery electric vehicle, a hybrid electric vehicle, a plug-in hybrid electric vehicle, or the like. To meet requirements of the apparatus for high power and high energy density of secondary batteries, a battery pack or a battery module may be used.

In another example, the apparatus may be a mobile phone, a tablet computer, a laptop computer, or the like. The apparatus is typically required to be light and thin and may use a secondary battery as a power source.

The following further describes beneficial effects of this application in conjunction with examples.

To make the technical problems solved by this application, the technical solutions, and the beneficial effects clearer, further detailed descriptions are provided below in conjunction with embodiments and drawings. Apparently, the described embodiments are merely some but not all of the embodiments of this application. The following description of at least one exemplary embodiment is merely illustrative and definitely is not construed as any limitation on this application or on use of this application. Based on the embodiments in this application, all other embodiments obtained by persons of ordinary skill in the art without creative efforts fall within the protection scope of this application. Materials used in the examples and comparative examples of this application are all commercially available.

For specific techniques or conditions that are not specified in the examples, reference is made to the techniques or conditions described in the literature in the art or to product specifications. The reagents or instruments used are all conventional products commercially available if no manufacturer is indicated.

I. Preparation of Positive Electrode Active Material

Example 1

Lithium hydroxide (used as a lithium salt), $Ni_{0.92}Co_{0.07}Mn_{0.01}(OH)_2$ (used as a nickel-containing material precursor), and yttrium oxide (used as an additive) were mixed in a high-speed mixer at a molar ratio of lithium element to Me of 1.03, then the mixed materials were placed in a kiln for a first sintering treatment at a sintering temperature of 760° C. for a sintering time of 20 h in a sintering atmosphere of $O_2$; after sintering, the materials were cooled with the furnace to obtain an intermediate product; and the intermediate product was mechanically ground and sieved to prepare a core; where Me is a total of nickel element, cobalt element, manganese element, and yttrium element, and a mass content of yttrium element in the prepared core relative to a mass of the core was 1500 ppm; and a chemical formula of the core was $LiNi_{0.92}Co_{0.07}Mn_{0.008}Y_{0.002}O_2$.

The core was mixed with nano cobalt tetraoxide (used as a precursor containing cobalt element), cerium oxide (used as a precursor containing cerium element), and ammonium fluoride (used as a precursor containing fluorine element) in a high-speed mixer, then the mixture was placed in a kiln for a second sintering treatment at a sintering temperature of 650° C. for a sintering time of 5 h in a sintering atmosphere of $O_2$; and after sintering, the mixture was cooled with the furnace to form a first coating layer on a surface of the core, followed by demagnetization and sieving for later use; where a molar ratio of cobalt element in the nano cobalt tetraoxide to cerium element in the cerium oxide was 0.1, and a total mass content of cobalt element in the nano cobalt tetraoxide, cerium element in the cerium oxide, and fluorine element in the ammonium fluoride relative to the mass of the core was 1000 ppm.

The core with the first coating layer formed on the outer surface thereof was mixed with aluminum trioxide (used as a precursor containing aluminum element) and orthoboric acid (used as a precursor containing boron element) in a high-speed mixer, then the mixture was placed in a kiln for a third sintering treatment at a sintering temperature of 400° C. for a sintering time of 5 h in a sintering atmosphere of $O_2$; and after sintering, a second coating layer was formed on a surface of the first coating layer, which was a positive electrode active material; where a mass ratio of aluminum element in the aluminum trioxide to boron element in the orthoboric acid was 1:1, and a total mass content of aluminum element in the aluminum trioxide and boron element in the orthoboric acid relative to the mass of the core was 1000 ppm.

Examples 2 to 30

A preparation method of the positive electrode active material in Examples 2 to 30 was substantially similar to the preparation method of the positive electrode material in Example 1, with a main difference that: at least one of a type and/or amount of the lithium salt, a type and/or amount of the nickel-containing material precursor, a type and/or amount of the additive, a type and/or amount of the precursor containing cobalt element, a type and/or amount of the precursor containing cerium element, a type and/or amount of the precursor containing aluminum element, a type and/or amount of the precursor containing boron element, a temperature and/or time and/or atmosphere for the first sintering treatment, a temperature and/or time and/or atmosphere for the second sintering treatment, and a temperature and/or time and/or atmosphere for the third sintering treatment was different.

It should be noted that, during the preparation process, after the type and/or amount of the lithium salt, the type and/or amount of the nickel-containing material precursor, the type and/or amount of the additive, the type and/or amount of the precursor containing cobalt element, the type and/or amount of the precursor containing cerium element, the type and/or amount of the precursor containing aluminum element, and the type and/or amount of the precursor containing boron element were set, a chemical formula of the core, a total mass content of cerium element and cobalt element in the first coating layer relative to a mass of the core, a molar ratio of cobalt element to cerium element, a mass content of fluorine element relative to the mass of the core, a mass ratio of aluminum element to boron element in the second coating layer, a mass content of aluminum element relative to the mass of the core, a mass content of boron element relative to the mass of the core, and a total thickness of the first coating layer and the second coating layer in the subsequently prepared positive electrode active material can each be uniquely determined, and the amounts of the lithium salt, nickel-containing material precursor, additive, precursor containing cobalt element, precursor containing cerium element, precursor containing aluminum element, and precursor containing boron element can be inversely deduced from the above items.

For ease of description, the above items of the positive electrode active material prepared in each example were respectively measured, and the measured items are listed in detail in Table 1 below, while the amounts of the lithium salt, nickel-containing material precursor, additive, precursor containing cobalt element, precursor containing cerium element, precursor containing aluminum element, and precursor containing boron element used in the preparation process are not listed.

Comparative Example 1

A preparation method of the positive electrode active material in Comparative Example 1 and the preparation method of the positive electrode active material in Example 1 differed in that: only the core was prepared as the positive electrode active material, and no coating layer was prepared on the outer surface of the core.

Comparative Example 2

A preparation method of the positive electrode active material in Comparative Example 2 and the preparation method of the positive electrode active material in Example 1 differed in that: during the preparation of the first coating layer, cerium element was not added, and an equal mass of cobalt element was used to replace cerium element, and no second coating layer was prepared outside the first coating layer.

Parameters of the positive electrode active materials prepared in the above examples and comparative examples, as well as some parameters in the preparation process, are shown in Table 1.

TABLE 1

| | Preparation process | | | | | | | |
|---|---|---|---|---|---|---|---|---|
| Group | Lithium salt | Nickel-containing materialprecursor | Additive | m1/m2 | First sintering treatment | Second sintering treatment | Third sintering treatment | Core |
| Example 1 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 2 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 3 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 4 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 5 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 6 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 7 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 8 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 9 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 10 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 11 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 12 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 13 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 14 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 15 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 16 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 17 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 18 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 19 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 20 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 21 | Lithium hydroxide | $Ni_{0.92}Co_{0.07}Mn_{0.01}(OH)_2$ | Yttrium oxide | 1.03 | 760° C. | 450° C. | 400° C. | $LiNi_{0.92}Co_{0.07}Mn_{0.008}Y_{0.002}O_2$ |
| Example 22 | Lithium hydroxide | $Ni_{0.92}Co_{0.07}Mn_{0.01}(OH)_2$ | Yttrium oxide | 1.03 | 760° C. | 700° C. | 400° C. | $LiNi_{0.92}Co_{0.07}Mn_{0.008}Y_{0.002}O_2$ |
| Example 23 | Lithium hydroxide | $Ni_{0.92}Co_{0.07}Mn_{0.01}(OH)_2$ | Niobium oxide | 1.03 | 760° C. | 650° C. | 400° C. | $LiNi_{0.92}Co_{0.07}Mn_{0.008}Nb_{0.002}O_2$ |
| Example 24 | Lithium hydroxide | $Ni_{0.92}Co_{0.07}Mn_{0.01}(OH)_2$ | Molybdenum oxide | 1.03 | 760° C. | 650° C. | 400° C. | $LiNi_{0.92}Co_{0.07}Mn_{0.008}Mo_{0.002}O_2$ |
| Example 25 | Lithium hydroxide | $Ni_{0.94}Co_{0.05}Mn_{0.01}(OH)_2$ | Yttrium oxide | 1.03 | 760° C. | 650° C. | 400° C. | $LiNi_{0.94}Co_{0.05}Mn_{0.008}Y_{0.002}O_2$ |
| Example 26 | Lithium hydroxide | $Ni_{0.90}Co_{0.07}Mn_{0.03}(OH)_2$ | Yttrium oxide | 1.03 | 760° C. | 650° C. | 400° C. | $LiNi_{0.90}Co_{0.07}Mn_{0.028}Y_{0.002}O_2$ |
| Example 27 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Example 28 | Lithium hydroxide | $Ni_{0.92}Co_{0.07}Mn_{0.01}(OH)_2$ | Yttrium oxide | 1.15 | 760° C. | 650° C. | 400° C. | $LiNi_{0.92}Co_{0.07}Mn_{0.008}Y_{0.002}O_2$ |
| Example 29 | Lithium hydroxide | $Ni_{0.92}Co_{0.07}Mn_{0.01}(OH)_2$ | Yttrium oxide | 0.85 | 760° C. | 650° C. | 400° C. | $LiNi_{0.92}Co_{0.07}Mn_{0.008}Y_{0.002}O_2$ |
| Example 30 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |

TABLE 1-continued

| | | | | | | | |
|---|---|---|---|---|---|---|---|
| Comparative Example 1 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |
| Comparative Example 2 | Lithium hydroxide | $Ni_{0.92}Co_{0.07}Mn_{0.01}(OH)_2$ | Yttrium oxide | 1.03 | 760° C. | 650° C. | 400° C. | $LiNi_{0.92}Co_{0.07}Mn_{0.008}Y_{0.002}O_2$ |

| | First coating layer | | | | | | Second coating layer |
|---|---|---|---|---|---|---|---|
| | Precursor containing cerium element | Precursor containing cobalt element | a1 (ppm) | n1 | Precursor containing fluorine element | a2 (ppm) | Precursor containing aluminum element |
| Example 1 | Cerium oxide | Cobalt tetraoxide | 11000 | 0.1 | Ammonium fluoride | 3000 | Aluminum trioxide |
| Example 2 | Cerium oxide | Cobalt tetraoxide | 15000 | 0.1 | Ammonium fluoride | 3000 | Aluminum trioxide |
| Example 3 | Cerium oxide | Cobalt tetraoxide | 20000 | 0.1 | Ammonium fluoride | 3000 | Aluminum trioxide |
| Example 4 | Cerium oxide | Cobalt tetraoxide | 1000 | 0.1 | Ammonium fluoride | 3000 | Aluminum trioxide |
| Example 5 | Cerium oxide | Cobalt tetraoxide | 100 | 0.1 | Ammonium fluoride | 3000 | Aluminum trioxide |
| Example 6 | Cerium oxide | Cobalt tetraoxide | 80 | 0.1 | Ammonium fluoride | 3000 | Aluminum trioxide |
| Example 7 | Cerium oxide | Cobalt tetraoxide | 22000 | 0.1 | Ammonium fluoride | 3000 | Aluminum trioxide |
| Example 8 | Cerium oxide | Cobalt tetraoxide | 11000 | 0.1 | / | 0 | Aluminum trioxide |
| Example 9 | Cerium oxide | Cobalt tetraoxide | 11000 | 0.1 | Ammonium fluoride | 300 | Aluminum trioxide |
| Example 10 | Cerium oxide | Cobalt tetraoxide | 11000 | 0.1 | Ammonium fluoride | 45000 | Aluminum trioxide |
| Example 11 | Cerium oxide | Cobalt tetraoxide | 11000 | 0.1 | Ammonium fluoride | 60000 | Aluminum trioxide |
| Example 12 | Cerium oxide | Cobalt tetraoxide | 11000 | 0.5 | Ammonium fluoride | 3000 | Aluminum trioxide |
| Example 13 | Cerium oxide | Cobalt tetraoxide | 11000 | 0.3 | Ammonium fluoride | 3000 | Aluminum trioxide |
| Example 14 | Cerium oxide | / | 11000 | 0 | Ammonium fluoride | 3000 | Aluminum trioxide |
| Example 15 | Cerium oxide | Cobalt tetraoxide | 11000 | 0.1 | Ammonium fluoride | 3000 | Aluminum trioxide |
| Example 16 | Cerium oxide | Cobalt tetraoxide | 11000 | 0.1 | Ammonium fluoride | 3000 | Aluminum trioxide |
| Example 17 | Cerium oxide | Cobalt tetraoxide | 11000 | 0.1 | Ammonium fluoride | 3000 | Aluminum trioxide |
| Example 18 | Cerium oxide | Cobalt tetraoxide | 11000 | 0.1 | Ammonium fluoride | 3000 | Aluminum trioxide |
| Example 19 | Cerium oxide | Cobalt tetraoxide | 11000 | 0.1 | Ammonium fluoride | 3000 | Aluminum trioxide |
| Example 20 | Cerium oxide | Cobalt tetraoxide | 11000 | 0.1 | Ammonium fluoride | 3000 | / |
| Example 21 | Cerium oxide | Cobalt tetraoxide | 11000 | 0.1 | Ammonium fluoride | 3000 | Aluminum trioxide |
| Example 22 | Cerium oxide | Cobalt tetraoxide | 11000 | 0.1 | Ammonium fluoride | 3000 | Aluminum trioxide |
| Example 23 | Cerium oxide | Cobalt tetraoxide | 11000 | 0.1 | Ammonium fluoride | 3000 | Aluminum trioxide |
| Example 24 | Cerium oxide | Cobalt tetraoxide | 11000 | 0.1 | Ammonium fluoride | 3000 | Aluminum trioxide |
| Example 25 | Cerium oxide | Cobalt tetraoxide | 11000 | 0.1 | Ammonium fluoride | 3000 | Aluminum trioxide |
| Example 26 | Cerium oxide | Cobalt tetraoxide | 11000 | 0.1 | Ammonium fluoride | 3000 | Aluminum trioxide |
| Example 27 | Cerium oxide | Cobalt tetraoxide | 33000 | 0.1 | Ammonium fluoride | 68000 | Aluminum trioxide |
| Example 28 | Cerium oxide | Cobalt tetraoxide | 1000 | 0.1 | Ammonium fluoride | 3000 | Aluminum trioxide |
| Example 29 | Cerium oxide | Cobalt tetraoxide | 11000 | 0.1 | Ammonium fluoride | 3000 | Aluminum trioxide |
| Example 30 | Cerium fluoride | Cobalt tetraoxide | 33000 | 0.1 | Cerium fluoride | 90000 | Aluminum trioxide |
| Comparative Example 1 | / | / | / | / | / | / | / |
| Comparative Example 2 | / | Cobalt tetraoxide | 11000 | / | Ammonium fluoride | 3000 | / |

TABLE 1-continued

| | Second coating layer | | | | | | | |
|---|---|---|---|---|---|---|---|---|
| | a3 (ppm) | Precursor containing boron element | a4 (ppm) | n2 | L (μm) | SPAN | Rsd(i) (%) | ODI |
| Example 1 | 500 | Orthoboric acid | 500 | 1 | 0.1 | 1.4 | 0.185 | 1.96 |
| Example 2 | 500 | Orthoboric acid | 500 | 1 | 0.13 | 1.4 | 0.17 | 1.98 |
| Example 3 | 500 | Orthoboric acid | 500 | 1 | 0.3 | 1.4 | 0.163 | 1.99 |
| Example 4 | 500 | Orthoboric acid | 500 | 1 | 0.04 | 1.4 | 0.24 | 1.86 |
| Example 5 | 500 | Orthoboric acid | 500 | 1 | 0.01 | 1.4 | 0.35 | 1.8 |
| Example 6 | 500 | Orthoboric acid | 500 | 1 | 0.01 | 1.4 | 0.36 | 1.79 |
| Example 7 | 500 | Orthoboric acid | 500 | 1 | 0.35 | 1.4 | 0.11 | 1.99 |
| Example 8 | 500 | Orthoboric acid | 500 | 1 | 0.08 | 1.4 | 0.195 | 1.95 |
| Example 9 | 500 | Orthoboric acid | 500 | 1 | 0.08 | 1.4 | 0.18 | 1.95 |
| Example 10 | 500 | Orthoboric acid | 500 | 1 | 0.76 | 1.4 | 0.156 | 1.96 |
| Example 11 | 500 | Orthoboric acid | 500 | 1 | 1 | 1.4 | 0.15 | 1.97 |
| Example 12 | 500 | Orthoboric acid | 500 | 1 | 0.12 | 1.4 | 0.181 | 1.97 |
| Example 13 | 500 | Orthoboric acid | 500 | 1 | 0.11 | 1.4 | 0.183 | 1.97 |
| Example 14 | 500 | Orthoboric acid | 500 | 1 | 0.09 | 1.4 | 0.188 | 1.95 |
| Example 15 | 100 | Orthoboric acid | 200 | 0.5 | 0.07 | 1.4 | 0.203 | 1.93 |
| Example 16 | 1000 | Orthoboric acid | 1000 | 1 | 0.16 | 1.4 | 0.176 | 1.96 |
| Example 17 | 2500 | Orthoboric acid | 2000 | 1.25 | 0.28 | 1.4 | 0.168 | 1.96 |
| Example 18 | 3500 | Orthoboric acid | 2500 | 1.4 | 0.37 | 1.4 | 0.159 | 1.97 |
| Example 19 | 200 | Orthoboric acid | 100 | 2 | 0.07 | 1.4 | 0.198 | 1.94 |
| Example 20 | / | / | / | / | 0.05 | 1.4 | 0.24 | 1.92 |
| Example 21 | 500 | Orthoboric acid | 500 | 1 | 0.12 | 1.4 | 0.196 | 1.75 |
| Example 22 | 500 | Orthoboric acid | 500 | 1 | 0.09 | 1.4 | 0.182 | 1.92 |
| Example 23 | 500 | Orthoboric acid | 500 | 1 | 0.1 | 1.4 | 0.182 | 1.95 |
| Example 24 | 500 | Orthoboric acid | 500 | 1 | 0.11 | 1.4 | 0.186 | 1.97 |
| Example 25 | 500 | Orthoboric acid | 500 | 1 | 0.1 | 1.4 | 0.191 | 1.92 |
| Example 26 | 500 | Orthoboric acid | 500 | 1 | 0.1 | 1.4 | 0.173 | 1.98 |
| Example 27 | 500 | Orthoboric acid | 500 | 1 | 1.8 | 1.4 | 0.133 | 2.01 |
| Example 28 | 500 | Orthoboric acid | 500 | 1 | 0.13 | 1.4 | 0.405 | 1.85 |
| Example 29 | 500 | Orthoboric acid | 500 | 1 | 0.08 | 1.4 | 0.096 | 1.68 |
| Example 30 | 6500 | Orthoboric acid | 6500 | 1 | 2.6 | 1.4 | 0.115 | 2.19 |
| Comparative Example 1 | / | / | / | / | 0.008 | 1.4 | 0.326 | 1.7 |
| Comparative Example 2 | / | / | / | / | 0.06 | 1.4 | 0.251 | 1.72 |

In Table 1, m1 represents a molar amount of lithium element contained in the lithium salt; m2 represents a sum of molar amounts of nickel element, cobalt element, and manganese element contained in the nickel-containing material precursor, and M element and M' element contained in the additive, where M element includes one or more of Zr, Y, Al, Ti, W, Sr, Ta, Mo, Sb, Nb, Na, K, and Ca, and M element includes one or more of N, F, S, and Cl; a1 represents a total mass content of cerium element and cobalt element in the first coating layer relative to the mass of the core; n1 represents a molar ratio of cobalt element to cerium element in the first coating layer; a2 represents a mass content of fluorine element in the first coating layer relative to the mass of the core; a3 represents a mass content of aluminum element in the second coating layer relative to the mass of the core; a4 represents a mass content of boron element in the second coating layer relative to the mass of the core; n2 represents a mass ratio of aluminum element to boron element in the second coating layer, L represents a total thickness of the first coating layer and the second coating layer; SPAN represents a volume particle size distribution span of the positive electrode active material; Rsd(Li) represents a residual lithium content of the positive electrode active material; and ODI represents an oxygen defect index of the positive electrode active material.

It should be noted that a chemical formula of the core mentioned above was determined with reference to the EPA 6010D-2014 standard, specifically as follows: testing was conducted using ICP-OES (elemental analysis—inductively coupled plasma optical emission spectrometry); a sample to be tested was first dissolved in a strong acid to obtain a liquid; then the liquid was introduced into an ICP light source through atomization; further, gaseous atoms to be tested underwent ionization and excitation in a strong magnetic field and then returned from an excited state to a ground state; energy was released during the above process and recorded as different characteristic spectral lines; and quantitative elemental analysis was performed based on the characteristic spectral lines.

The total mass content of cerium element and cobalt element relative to the mass of the core and a molar ratio of cobalt element to cerium element in the first coating layer mentioned above were determined with reference to the EPA 6010D-2014 standard, specifically as follows: testing was conducted using ICP-OES (elemental analysis—inductively coupled plasma optical emission spectrometry); a sample to be tested was first dissolved in a strong acid to obtain a liquid; then the liquid was introduced into an ICP light source through atomization; further, gaseous atoms to be tested underwent ionization and excitation in a strong magnetic field and then returned from an excited state to a ground state; energy was released during the above process and recorded as different characteristic spectral lines; elemental trace analysis was performed based on the characteristic spectral lines to determine the form of existence of Co and Ce elements; and the above various items were calculated.

The mass content of fluorine element relative to the mass of the core in the first coating layer mentioned above was determined using the following method: qualitative or semi-quantitative analysis was conducted using EDS (energy-dispersive X-ray spectroscopy), to be specific, an electron beam was used to bombard a sample surface in a vacuum chamber to excite the material to emit characteristic X-rays; and qualitative and semi-quantitative analysis was performed for fluorine element based on a wavelength of the characteristic X-rays.

The mass content of aluminum element relative to the mass of the core, the mass content of boron element relative to the mass of the core, and the mass ratio of aluminum element to boron element in the second coating layer mentioned above were determined with reference to the EPA 6010D-2014 standard, specifically as follows: testing was conducted using ICP-OES (elemental analysis—inductively coupled plasma optical emission spectrometry); a sample to be tested was first dissolved in a strong acid to obtain a liquid; then the liquid was introduced into an ICP light source through atomization; further, gaseous atoms to be tested underwent ionization and excitation in a strong magnetic field and then returned from an excited state to a ground state; energy was released during the above process and recorded as different characteristic spectral lines; and quantitative elemental analysis was performed based on the characteristic spectral lines.

The sum of thicknesses of the first coating layer and the second coating layer mentioned above was determined using the following method: a sample preparation adhesive was uniformly mixed with composite positive electrode material powder and applied onto a copper foil to obtain a sample, where a weight of the powder was 5 times that of the sample preparation adhesive; then the sample was dried at 60° C. for 30 min. The prepared sample was cut into a size of 6 mm×6 mm with scissors and fixed on a sample table; the sample table was placed in an IB-19500CP ion polisher, with a sample edge adjusted to be parallel to a centerline X-axis; and cutting was performed at a 40-60 μm position of a Y-axis. After cutting, an X-Max energy spectrometer (EDS) was used in combination with a Sigma-02-33 scanning electron microscope (SEM); an appropriate particle cross-section was selected from the cut sample; and linear scanning of characteristic element content of the first coating layer and characteristic element content of the second coating layer was performed along a diameter direction of the particle; a radius of the particle was measured as R; where a distance from a position where the element content of the first coating layer began to increase compared to the core to a center position of the particle was Li; a distance from a position where the element content of the second coating layer began to increase compared to the core to the center position of the particle was L2; and a total thickness L of the first coating layer and the second coating layer was (R–L1) μm.

The volume particle size distribution span of the positive electrode active material mentioned above was determined using the following method: a Mastersizer 3000E laser particle size analyzer from Malvern Instruments Ltd., UK, was used, and with reference to the GB/T 19077-2016/ISO 13320:2009 particle size distribution laser diffraction method, the volume-based average particle size $D_v90$, the volume-based average particle size $D_v50$, and the volume-based average particle size $D_v10$ of the positive electrode active material were measured, then the volume particle size distribution span of the positive electrode active material was calculated according to a formula $(d_{90}-d_{10})/d_{50}$.

The residual lithium content of the positive electrode active material mentioned above was determined with reference to the GB/T 9736-2008 general method for determination of acidity and alkalinity of chemical reagents, specifically as follows: 10 g-30 g of sample powder to be tested was weighed, added with 100 mL pure water, stirred for 30 min; and left standing for 10 min; a certain amount of filtrate was taken after suction filtration; a 0.05 mol/L standard hydrochloric acid solution was selected to expel bubbles in a titration tube; a corresponding sensor and program were selected to start a potentiometric titration test; and the residual lithium content was calculated based on reaction potentials of carbonate and hydroxide ions.

The oxygen defect index of the positive electrode active material mentioned above was determined using the following method: a region from 35°-50° in an XRD spectrum of a sample to be tested was scanned slowly (<2°/min), and an image was processed by smoothing and filtering to obtain diffraction peak areas I101 and I012 of (101) and (012) crystal planes; and the oxygen defect index was calculated according to (I101/I012)^0.5.

II. Preparation of Secondary Battery

1. Preparation of Positive Electrode Plate

The positive electrode active material was placed in a 5 L mixing tank for premixing for 30 min and then added with acetylene black (SP, used as a conductive agent) and polyvinylidene fluoride (PVDF, used as a binder); and secondary dry materials were mixed for 30 min. Finally. N-methylpyrrolidone (NMP, used as a solvent) was added under a vacuum condition for rapid stirring to form a slurry. A mass ratio of the positive electrode active material, the acetylene black, and the polyvinylidene fluoride was 96:2:2, and a solid content of the slurry was 70 wt %. The slurry was uniformly applied onto both surfaces of an aluminum foil with a thickness of 12 μm, and the coated electrode plate was dried in an oven at 130° C. for half an hour and then removed. A single-side loading amount of the positive electrode active material on the electrode plate was 21.5 mg/cm$^2$. The removed positive electrode plate was cold-pressed by a roller, and then a compacted density was tested and obtained.

2. Preparation of Negative Electrode Plate

Artificial graphite (used as a negative electrode active material), hard carbon (used as a negative electrode active material), conductive agent acetylene black (used as a conductive agent), styrene-butadiene rubber (SBR, used as a binder), and sodium carboxymethyl cellulose (CMC, used as a thickener) were thoroughly and uniformly mixed in a deionized water solvent system at a weight ratio of 90:5:2:2:1, and then applied on both surfaces of a copper foil, and the copper foil was dried and cold-pressed to obtain a negative electrode plate.

3. Separator

A polyethylene porous polymer film was used as a separator.

4. Preparation of Electrolyte

Ethylene carbonate (EC), ethyl methyl carbonate (EMC), and dimethyl carbonate (DMC) were mixed at a volume ratio of 1:1:1, and then $LiPF_6$ was uniformly dissolved in the solution to obtain an electrolyte. A concentration of $LiPF_6$ in the electrolyte was 1 mol/L.

5. Preparation of Battery Cell

The positive electrode plate, the separator, and the negative electrode plate were stacked in sequence, so that the separator was located between the positive and negative electrodes for separation, and winding was performed to obtain a jelly roll. The jelly roll was placed in an outer package, the prepared electrolyte was injected, and sealing was performed to obtain a secondary battery.

III. Performance Test of Secondary Battery

1. Gram Capacity Test for Full Battery at 1/3 C

In a constant-temperature environment at 25° C., the battery was left standing for 5 min, discharged at 1/3 C to 2.8 V, left standing for 5 min, charged at 1/3 C to 4.25 V, then charged at a constant voltage of 4.25 V until a current was ≤0.05 C, left standing for 5 min. and then discharged at 1/3 C to 2.8 V; and a discharge capacity at that time was an initial gram capacity, denoted as IX).

2. Initial Coulombic Efficiency Test

At a voltage of 2.8-4.25 V, a button cell was charged at 0.1 C to 4.3 V, then charged at a constant voltage of 4.3 V until a current was ≤0.05 mA, and left standing for 2 min; a charging capacity at that time was denoted as C0; then the battery was discharged at 0.1 C to 2.8 V; and a discharge capacity at that time was an initial gram capacity, denoted as D0.

The initial efficiency was calculated according to D0/C0×100%.

3. High-Temperature Cycling Performance

At 45° C., the battery was charged at a constant current of 1 C to 4.25 V, then charged at a constant voltage of 4.25 V until a current dropped to 0.05 C, and discharged at a constant current of 1 C to 2.8 V to obtain a first-cycle discharge specific capacity (Cd1); the battery was repeatedly charged and discharged to the 300th cycle; and a discharge specific capacity after n cycles of the lithium-ion battery was denoted as Cdn. A capacity retention rate was calculated as discharge specific capacity after n cycles (Cdn)/first-cycle discharge specific capacity (Cd1).

4. High-Temperature Storage Performance

The secondary batteries prepared in the above examples and comparative examples were respectively left standing in a constant-temperature environment at 25° C. for 5 min, discharged at 1/3 C to 2.8 V, left standing for 5 min, charged at 1/3 C to 4.25 V, then charged at a constant voltage of 4.25 V until a current was ≤0.05 mA, and left standing for 5 min; a charging capacity at that time was denoted as C0; then each battery was discharged at 1/3 C to 2.8 V; and a discharge capacity at that time was an initial gram capacity, denoted as DO. Then, each battery was charged at a constant current of 0.33 C to 4.25 V and held at a constant voltage until a current was ≤0.05 mA, left standing for 5 min, then placed in a high-low temperature chamber at 60° C., left standing for 1 h until a temperature of the battery reached a target temperature, and then stored. After 15 days, the battery was removed, and the above processes were repeated in a constant-temperature environment at 25° C., with a capacity Dn (n=0, 1, 2, . . . ) recorded every 15 days; and a capacity retention rate after 60 days of storage was calculated as: (D4−D0)/D0×100%.

5. High-Temperature Storage Gas Production Performance

At 70° C., a full battery at 100% state of charge (SOC) was stored. An open-circuit voltage (OCV) and an AC internal resistance (IMP) of the battery cell were measured before, during, and after storage to monitor the SOC, and a volume of the battery cell was measured. The full battery was removed every 48 h during storage; after the battery was left standing for 1 h, the OCV and IMP were tested; and after the battery was cooled to room temperature, the volume of the battery cell was measured using a water displacement method. The water displacement method involved measuring a gravity F1 of the battery cell alone using a balance with automatic unit conversion based on dial data, then immersing the entire battery cell in deionized water (with a known density of 1 g/cm$^3$) and measuring a gravity F2 of the battery cell at that time, where a buoyant force $F_{float}$ at applied to the battery cell was F1-F2, and based on the Archimedes' principle $F_{float}=\rho g V_{displaced}$, the volume of the battery cell V was calculated as (F1-F2)/ρg.

After each volume test, the battery cell was recharged by being charged at a constant current of 1 C to 4.25 V and then charged at a constant voltage of 4.25 V until a current dropped to 0.05 C; and after recharging, the battery cell was returned to the oven for continued testing.

After 60 days of storage, the volume of the battery cell was measured, and an increase in the volume of the battery cell after storage relative to the volume before storage, that is, a gas production, was calculated.

Performance test results of the above examples and comparative examples are shown in Table 2 below.

TABLE 2

| Group | Initial Coulombic efficiency | Initial discharge gram capacity (mAh/g) | Capacity retention rate after high-temperature cycling | High-temperature storage capacity retention rate | High-temperature storage gas production (mL/Ah) |
|---|---|---|---|---|---|
| Example 1 | 90.5% | 220.5 | 92.5% | 95.5% | 5.8 |
| Example 2 | 89.9% | 219.8 | 92.5% | 95.6% | 5.8 |
| Example 3 | 89.7% | 219.2 | 92.7% | 95.6% | 5.6 |
| Example 4 | 89.3% | 219.4 | 91.5% | 94.7% | 7.1 |
| Example 5 | 88.8% | 218.8 | 90.9% | 94.3% | 7.9 |
| Example 6 | 88.6% | 218.6 | 90.4% | 94.0% | 8.3 |
| Example 7 | 89.4% | 217.8 | 92.0% | 95.0% | 5.0 |
| Example 8 | 90.4% | 220.1 | 92.2% | 95.3% | 6.4 |
| Example 9 | 90.4% | 220.3 | 92.3% | 95.4% | 6.1 |
| Example 10 | 88.9% | 219.0 | 92.5% | 95.6% | 5.3 |
| Example 11 | 88.6% | 218.1 | 92.5% | 95.7% | 5.3 |
| Example 12 | 90.7% | 220.4 | 92.4% | 95.3% | 6.2 |
| Example 13 | 90.6% | 220.5 | 92.5% | 95.4% | 5.9 |
| Example 14 | 89.7% | 220.1 | 92.3% | 95.3% | 5.7 |
| Example 15 | 89.8% | 220.0 | 92.3% | 95.2% | 6.6 |
| Example 16 | 89.6% | 219.6 | 92.5% | 95.3% | 5.9 |
| Example 17 | 89.3% | 219.1 | 92.6% | 95.5% | 5.5 |
| Example 18 | 89.1% | 218.2 | 92.7% | 95.5% | 5.1 |
| Example 19 | 89.7% | 219.8 | 92.4% | 95.3% | 6.3 |
| Example 20 | 89Org.5% | 219.2 | 91.8% | 94.9% | 8.5 |
| Example 21 | 90.1% | 219.9 | 90.7% | 94.1% | 8.7 |
| Example 22 | 89.9% | 219.8 | 92.4% | 95.5% | 5.8 |
| Example 23 | 90.5% | 220.8 | 92.0% | 95.1% | 6.2 |
| Example 24 | 90.5% | 220.6 | 92.2% | 95.3% | 6.0 |
| Example 25 | 90.3% | 220.9 | 91.6% | 94.8% | 7.7 |
| Example 26 | 90.8% | 218.6 | 92.8% | 95.8% | 4.2 |
| Example 27 | 88.3% | 217.5 | 92.6% | 95.7% | 5.1 |
| Example 28 | 90.6% | 220.6 | 92.1% | 95.0% | 6.8 |
| Example 29 | 86.8% | 217.0 | 90.5% | 93.7% | 6.6 |
| Example 30 | 84.6% | 215.8 | 92.8% | 96.0% | 3.6 |
| Comparative Example 1 | 87.5% | 211.9 | 87.6% | 90.3% | 10.6 |
| Comparative Example 2 | 88.6% | 213.6 | 89.5% | 91.4% | 9.5 |

From the results of Examples 1 to 25 and Comparative Examples 1 and 2 in Table 2, preparing a positive electrode active material by forming a coating layer containing cerium element on at least a portion of an outer surface of a core, and using this positive electrode active material to prepare a secondary battery can increase the initial discharge gram capacity and initial Coulomnhic efficiency of the secondary battery, as well as improve the high-temperature cycling performance and high-temperature storage performance of the secondary battery.

Examples 1 to 7 differ in that the total mass content of cerium element and cobalt element relative to the mass of the core in the first coating layer is different, which is minimal in Example 6 and maximal in Example 7. As compared to the results of Examples 1 to 5. Example 6 exhibits a significant increase in high-temperature storage gas production, along with a decrease in high-temperature storage capacity retention rate and high-temperature cycling capacity retention rate. Technical personnel analyzes that the reason may be that when the total mass content of cerium element and cobalt element relative to the mass of the core in the first coating layer is too low, a compact coating layer may not be effectively formed on the core surface, thus potentially failing to effectively reduce erosion of active sites of the core by electrolyte byproducts, resulting in limited improvement in high-temperature cycling performance and high-temperature storage performance of the secondary battery. As compared to the results of Examples 1 to 5. Example 7 exhibits a decrease in initial discharge gram capacity. Technical personnel analyzes that the reason may be that when the total mass content of cerium element and cobalt element relative to the mass of the core in the first coating layer is too high, elements may form island-like accumulation on the core surface, potentially leading to a decrease in gram capacity.

Example 1 and Examples 8 to 11 differ in that the mass content of fluorine element relative to the mass of the core in the first coating layer is different, which is minimal in Example 8 and maximal in Example 11. As compared to Example 1 and Examples 9 to 11, Example 8 exhibits higher high-temperature storage gas production. Technical personnel analyzes that the reason may be that the presence of fluorine element in the first coating layer helps resist hydrogen fluoride generated in the battery during high-temperature storage, protecting the core surface from corrosion and reducing gas production. As compared to Example 1 and Examples 8 to 10. Example 11 exhibits a decrease in initial discharge gram capacity. Technical personnel analyzes that the reason may be that when the mass content of fluorine element relative to the mass of the core in the first coating layer is high, a large amount of fluorine element may lead to an increase in a valence state of nickel element, potentially affecting the exertion of the gram capacity.

Example 1 and Examples 12 to 14 differ in that the molar ratio of cobalt element to cerium element in the first coating layer is different. From the results of Example 1 and Examples 12 to 14, it can be learned that when the molar ratio of cobalt element to cerium element in the first coating layer is within (0-0.5):1, the secondary battery can have excellent gram capacity, initial Coulombic efficiency, high-temperature storage performance, and high-temperature cycling performance, as well as lower high-temperature storage gas production.

Example 1 and Examples 15 to 19 differ in that the mass content of aluminum element and boron element relative to the mass of the core and the mass ratio of aluminum element to boron element in the second coating layer are different. From the results of Example 1 and Examples 15 to 19, it can be learned that when the mass content of aluminum element and boron element relative to the mass of the core and the mass ratio of aluminum element to boron element in the second coating layer are within the above ranges, the secondary battery has excellent gram capacity, initial Coulombic efficiency, high-temperature storage performance, and high-temperature cycling performance, as well as lower high-temperature storage gas production.

Example 1 and Examples 21 to 22 differ in that the temperature of the second sintering treatment during preparation of the first coating layer is different, where the second sintering treatment temperature is lower in Example 21. As compared to Example 1 and Example 22, Example 21 exhibits a lower oxygen defect index of the positive electrode active material, a decrease in high-temperature cycling capacity retention rate of the secondary battery, and an increase in high-temperature storage gas production. Technical personnel analyzes that the reason may be that more oxygen defects in the structure of the positive electrode active material results in weaker binding of transition metal elements and other oxygen atoms in the surrounding coordination environment, leading to greater loss of active materials such as active lithium and transition metals and greater oxygen loss, thus reducing the high-temperature cycling capacity retention rate and increasing the high-temperature storage gas production.

Example 27 and Example 1 differ in that in Example 27, the total mass content of cerium element and cobalt element relative to the mass of the core and the mass content of fluorine element relative to the mass of the core in the first coating layer are both excessively high. As compared to Example 1, Example 27 exhibits a decrease in both initial Coulombic efficiency and initial discharge gram capacity. Technical personnel analyzes that the reason may be that when the total mass content of cerium element and cobalt element and the mass content of fluorine element in the first coating layer are both excessively high, elements may form island-like accumulation on the core surface, potentially leading to a decrease in gram capacity. In addition, an excessively low residual lithium content of the positive electrode material may result in insufficient active lithium in the positive electrode active material, further affecting the Coulombic efficiency and gram capacity of the secondary battery.

Example 1 and Examples 28 and 29 differ in that a relative molar proportion of lithium element contained in the lithium salt in the raw materials during core preparation is different, which is maximal in Example 28 and minimal in Example 29. As compared to Example 1, Example 28 exhibits a significant increase in residual lithium content of the positive electrode active material and an increase in high-temperature storage gas production of the secondary battery. Technical personnel analyzes that the reason may be that an excessive addition of lithium element leads to an increase in residual lithium content of the positive electrode active material, potentially increasing side reactions between residual lithium and the electrolyte, thus increasing gas production of the secondary battery. As compared to Example 1, Example 29 exhibits a decrease in residual lithium content and oxygen defect index of the positive electrode active material, a significant decrease in initial Coulombic efficiency, initial discharge gram capacity, high-temperature cycling capacity retention rate, and high-temperature storage capacity retention rate of the secondary battery, and an increase in high-temperature storage gas production. Technical personnel analyzes that the reason may be that an insufficient addition of lithium element may easily form a lithium-containing rock-salt phase in a bulk structure of the positive electrode active material, significantly reducing electronic conductivity and causing loss of active lithium, potentially leading to a significant decrease in gram capacity and Coulombic efficiency, accompanied by a decrease in high-temperature cycling capacity retention rate. In addition, a large number of lithium vacancy defects may further exacerbate oxygen loss, leading to a decrease in high-temperature storage capacity retention rate and an increase in high-temperature storage gas production.

In Example 30, cerium fluoride is used as a precursor containing cerium element and fluorine element, and amounts of coating materials for both the first coating layer and the second coating layer are large. Example 30 exhibits a decrease in residual lithium content of the positive electrode active material, a significant decrease in initial Coulombic efficiency and initial discharge gram capacity of the secondary battery, and a significant decrease in high-temperature storage gas production. Technical personnel analyzes that the reason may be that addition of a large amount of cerium fluoride and cobalt tetraoxide may cause a significant consumption of residual lithium on the core surface layer, significantly reducing the gram capacity. Additionally, coating of a large amount of aluminum trioxide and orthoboric acid may greatly enhance a compact protective strength of the core, thus significantly reducing high-temperature storage gas production.

In conclusion, the above description is merely specific embodiments of this application, but the protection scope of this application is not limited thereto. Any person skilled in the art can easily conceive various equivalent modifications or substitutions within the technical scope disclosed in this application, and these modifications or substitutions should fall within the protection scope of this application. Therefore, the protection scope of this application shall be subject to the protection scope of the claims.

What is claimed is:

1. A positive electrode active material, comprising:

a core, wherein the core comprises a lithium-containing nickel-based transition metal oxide, and in the lithium-containing nickel-based transition metal oxide, a molar proportion of nickel element among all elements excluding lithium element and oxygen element ranges from 50% to 100%;

a first coating layer, applied on at least a portion of an outer surface of the core, wherein the first coating layer comprises cerium element; and a second coating layer applied on at least a portion of an outer surface of the first coating layer, the second coating layer comprising aluminum element and boron element.

2. The positive electrode active material according to claim 1, wherein the first coating layer further comprises one or more of cobalt element and fluorine element.

3. The positive electrode active material according to claim 2, wherein the first coating layer has at least one of the following characteristics:

(1) a total mass content of the cerium element and the cobalt element relative to a mass of the lithium-containing nickel-based transition metal oxide in the core ranges from 100 ppm to 20000 ppm; and optionally, a molar ratio of the cobalt element to the cerium element is (0-0.5):1; and (2) a mass content of the fluorine element relative to the mass of the lithium-containing nickel-based transition metal oxide in the core ranges from 0 ppm to 60000 ppm.

4. The positive electrode active material according to claim 1, wherein a chemical formula of the lithium-containing nickel-based transition metal oxide is $LiNi_xCo_yMn_zM_aM'_bO_2$, wherein M element comprises one or more of Zr, Y, Al, Ti, W, Sr, Ta, Mo, Sb, Nb, Na, K, and Ca, M element comprises one or more of N, F, S, and Cl, $0.6 \leq x \leq 1$, and $x+y+z+a+b=1$.

5. The positive electrode active material according to claim 4, wherein $0.8 \leq x \leq 1$, $0 \leq y \leq 0.2$, $0 \leq z \leq 0.2$, and $0 \leq a \leq 0.1$.

6. The positive electrode active material according to claim 1, wherein the aluminum element and the boron element of the second coating layer is in a mass ratio of (0.5-2):1;

optionally, a mass content of the aluminum element relative to the mass of the lithium-containing nickel-based transition metal oxide in the core ranges from 100 ppm to 3500 ppm; and optionally, a mass content of the boron element relative to the mass of the lithium-containing nickel-based transition metal oxide in the core ranges from 100 ppm to 2500 ppm.

7. The positive electrode active material according to claim 1, wherein a sum of thicknesses of the first coating layer and the second coating layer ranges from 0.01 μm to 1 μm.

8. The positive electrode active material according to claim 1, wherein a volume-based average particle size $D_v90$ of the positive electrode active material is denoted as $d_{90}$, a volume-based average particle size $D_v50$ of the positive electrode active material is denoted as $d_{50}$, a volume-based average particle size $D_v10$ of the positive electrode active material is denoted as $d_{10}$, and the volume-based average particle size $D_v90$, the volume-based average particle size $D_v50$, and the volume-based average particle size $D_v10$ of the positive electrode active material satisfy: $(d_{90}-d_{10})/d_{50}\geq 0.5$.

9. The positive electrode active material according to claim 1, wherein a residual lithium content of the positive electrode active material is denoted as Rsd(Li), and the residual lithium content of the positive electrode active material satisfies: 0.15 wt %≤Rsd(Li)≤0.35 wt %.

10. The positive electrode active material according to claim 1, wherein an oxygen defect index of the positive electrode active material is denoted as ODI, and the oxygen defect index of the positive electrode active material satisfies: ODI≥1.75.

11. A positive electrode plate, comprising:

a positive electrode current collector; and a positive electrode active material layer, located on at least one side of the positive electrode current collector, wherein the positive electrode active material layer comprises the positive electrode active material according to claim 1.

12. A secondary battery, comprising the positive electrode plate according to claim 11.

13. A positive electrode active material, comprising:

a core, wherein the core comprises a lithium-containing nickel-based transition metal oxide, and in the lithium-containing nickel-based transition metal oxide, a molar proportion of nickel element among all elements excluding lithium element and oxygen element ranges from 50% to 100%; and a first coating layer, applied on at least a portion of an outer surface of the core, wherein the first coating layer comprises cerium element;

wherein a volume-based average particle size $D_v90$ of the positive electrode active material is denoted as $d_{90}$, a volume-based average particle size $D_v50$ of the positive electrode active material is denoted as $d_{50}$, a volume-based average particle size $D_v10$ of the positive electrode active material is denoted as $d_{10}$, and the volume-based average particle size $D_v90$, the volume-based average particle size $D_v50$, and the volume-based average particle size $D_v10$ of the positive electrode active material satisfy: $(d_{90}-d_{10})/d_{50}\geq 0.5$.

14. A positive electrode active material, comprising:

a core, wherein the core comprises a lithium-containing nickel-based transition metal oxide, and in the lithium-containing nickel-based transition metal oxide, a molar proportion of nickel element among all elements excluding lithium element and oxygen element ranges from 50% to 100%; and a first coating layer, applied on at least a portion of an outer surface of the core, wherein the first coating layer comprises cerium element;

wherein an oxygen defect index of the positive electrode active material is denoted as ODI, and the oxygen defect index of the positive electrode active material satisfies: ODI≥1.75.

15. A preparation method of the positive electrode active material according to claim 1, comprising:

mixing a lithium salt, a nickel-containing material precursor, and an optional additive, and performing a first sintering treatment to prepare the core; and mixing the core, a precursor containing cerium element, an optional precursor containing cobalt element, and an optional precursor containing fluorine element, and performing a second sintering treatment to prepare the first coating layer on an outer surface of the core;

wherein an element contained in the optional additive comprises one or more of Zr, Y, Al, Ti, W, Sr, Ta, Mo, Sb, Nb, Na, K, Ca, N, F, S, and Cl.

16. The preparation method according to claim 15, wherein a molar amount of lithium element contained in the lithium salt is denoted as m1, a sum of molar amounts of nickel element, cobalt element and manganese element contained in the nickel-containing material precursor and the one or more of Zr, Y, Al, Ti, W, Sr, Ta, Mo, Sb, Nb, Na, K, Ca, N, F, S, and Cl contained in the optional additive is denoted as m2, and a ratio of m1 to m2 is (0.9-1.1):1.

17. The preparation method according to claim 15, wherein the lithium salt comprises one or more of lithium hydroxide, lithium carbonate, lithium acetate, lithium nitrate, lithium oxalate, and lithium sulfate;

the optional additive comprises one or more of an oxide, hydroxide, acid, fluoride, chloride, sulfate, nitrate, oxalate, acetate, carbonate, lithium salt, ammonium salt, or sodium salt of the one or more of Zr, Y, Al, Ti, W, Sr, Ta, Mo, Sb, Nb, Na, K, and Ca, and an ammonium salt containing the one or more of N, F, S, and Cl;

the precursor containing cerium element comprises one or more of cerium oxide, cerium fluoride, cerium chloride, cerium sulfide, cerium nitrate, and cerium hydroxide;

the optional precursor containing fluorine element comprises one or more of cerium fluoride and ammonium fluoride; and the optional precursor containing cobalt element comprises one or more of cobalt tetraoxide, cobalt hydroxide, cobaltous oxide, cobalt hydroxyoxide, cobalt acetate, cobalt oxalate, and cobalt carbonate.

18. The preparation method according to claim 15, wherein:

the first sintering treatment comprises at least one of the following conditions:

(1) a sintering temperature ranges from 700° C. to 900° C.;

(2) a sintering time ranges from 10 h to 20 h; and (3) a sintering atmosphere is selected from one of air and oxygen; and the second sintering treatment comprises at least one of the following conditions:

(4) a sintering temperature ranges from 300° C. to 650° C.;

(5) a sintering time ranges from 3 h to 10 h; and (6) a sintering atmosphere is selected from one of air and oxygen.

19. The preparation method according to claim 15, further comprising:

after preparing the first coating layer on the surface of the core, mixing the core with a precursor containing aluminum element and a precursor containing boron element, and performing a third sintering treatment to apply the second coating layer on an outer surface of the first coating layer.

20. The preparation method according to claim 19, wherein:

the precursor containing aluminum element comprises one or more of aluminum trioxide, aluminum hydroxide, aluminum sulfate, aluminum chloride, and aluminum nitrate; and the precursor containing boron element comprises one or more of boron chloride, boron sulfate, boron nitrate, boron nitride, boron oxide, boron fluoride, boron bromide, boron iodide, boric acid, $H_2BO_5PC_5H_6B(OH)_2$, $C_3H_9B_3O_6$, $(C_2H_5O)_3B$, and $(C_3H_7O)_3B$.

* * * * *